United States Patent
Bhattacharyya et al.

(10) Patent No.: US 10,554,636 B2
(45) Date of Patent: Feb. 4, 2020

(54) LIGHTWEIGHT ENCRYPTED COMMUNICATION PROTOCOL

(71) Applicant: Amazon Technologies, Inc., Seattle, WA (US)

(72) Inventors: Ramkishore Bhattacharyya, Woodinville, WA (US); Amit J. Mhatre, Seattle, WA (US); Ashutosh Thakur, Bellevue, WA (US); Atulya S. Beheray, Sammamish, WA (US); Rameez Loladia, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/186,425

(22) Filed: Nov. 9, 2018

(65) Prior Publication Data

US 2019/0097982 A1 Mar. 28, 2019

Related U.S. Application Data

(62) Division of application No. 15/360,862, filed on Nov. 23, 2016, now Pat. No. 10,129,223.

(51) Int. Cl.
*H04L 29/06* (2006.01)
*H04L 9/08* (2006.01)
*H04L 9/14* (2006.01)

(52) U.S. Cl.
CPC ........ *H04L 63/0435* (2013.01); *H04L 9/0841* (2013.01); *H04L 9/0861* (2013.01); *H04L 9/14* (2013.01); *H04L 63/0869* (2013.01)

(58) Field of Classification Search
CPC . H04L 63/0435; H04L 9/0643; H04L 9/0841; H04L 9/14; H04L 9/0861

(Continued)

(56) References Cited

U.S. PATENT DOCUMENTS 5,913,925 A 6/1999 Kahle et al.
5,961,639 A 10/1999 Mallick et al.
(Continued)

OTHER PUBLICATIONS

Dang, "Recommendation for Applications Using Approved Hash Algorithms" NIST Special Publication 800-107, Revision 1, National Institute of Standards and Technology (NIST), Aug. 2012, retrieved on Nov. 24, 2015, from https://nvlpubs.nist.gov/nistpubs/Legacy/SP/nistspecialpublication800-107r1.pdf, 25 pages.

(Continued)

*Primary Examiner* — Haresh N Patel
(74) *Attorney, Agent, or Firm* — Davis Wright Tremaine LLP

(57) ABSTRACT

A lightweight network protocol provides mutual authentication and encryption of a communication channel in environments where the amount of computing resources available to the networked devices is constrained. When a new device is added to a network, the device contacts a registration service and provides information that is published via a device directory. The network entity locates the device via information provided by the device directory, and establishes an encrypted network connection with the device. A shared secret is established between the device and the network entity using a key-exchange protocol. Consecutive messages that are sent or received are encrypted or decrypted with a sequence of cryptographic keys generated based at least in part on the shared secret. Key-exchange parameters are added to message exchanges between the device and the network entity to facilitate regenerating the shared secret.

20 Claims, 12 Drawing Sheets

(58) Field of Classification Search
USPC .......................................... 713/171, 155, 156
See application file for complete search history.

(56) References Cited

U.S. PATENT DOCUMENTS

| | | | |
|---|---|---|---|
| 6,212,542 B1 | 4/2001 | Kahle et al. | |
| 10,129,223 B1 | 11/2018 | Bhattacharyya et al. | |
| 2002/0178398 A1 | 11/2002 | Sekiguchi | |
| 2005/0010680 A1* | 1/2005 | Zick | H04L 63/0853 709/237 |
| 2005/0120213 A1* | 6/2005 | Winget | H04L 63/0442 713/171 |
| 2007/0136579 A1* | 6/2007 | Levy | H04L 63/102 713/168 |
| 2007/0204166 A1* | 8/2007 | Tome | H04L 63/0272 713/182 |
| 2008/0091954 A1 | 4/2008 | Morris et al. | |
| 2008/0130895 A1* | 6/2008 | Jueneman | H04L 9/3066 380/277 |
| 2008/0317250 A1 | 12/2008 | Matsuo et al. | |
| 2009/0055642 A1* | 2/2009 | Myers | H04L 63/0869 713/155 |
| 2009/0094673 A1* | 4/2009 | Seguin | G06F 21/51 726/1 |
| 2009/0172781 A1* | 7/2009 | Masuoka | H04L 63/105 726/3 |
| 2009/0204964 A1* | 8/2009 | Foley | G06F 21/53 718/1 |
| 2010/0050239 A1* | 2/2010 | Carter | H04L 63/0823 726/4 |
| 2010/0205443 A1* | 8/2010 | Zhao | H04L 9/0841 713/171 |
| 2011/0004921 A1 | 1/2011 | Homer et al. | |
| 2011/0145152 A1 | 6/2011 | McCown | |
| 2011/0145592 A1 | 6/2011 | Greiner | |
| 2011/0210171 A1* | 9/2011 | Brown | G06Q 20/3276 235/382 |
| 2011/0246778 A1* | 10/2011 | Duane | G06F 21/57 713/176 |
| 2011/0249079 A1 | 10/2011 | Santamaria et al. | |
| 2012/0023568 A1* | 1/2012 | Cha | G06F 21/335 726/10 |
| 2012/0054359 A1* | 3/2012 | Yamada | H04L 63/0869 709/229 |
| 2012/0233668 A1* | 9/2012 | Leafe | G06F 9/44526 726/4 |
| 2012/0260250 A1* | 10/2012 | Maeda | G06F 21/53 718/1 |
| 2012/0266170 A1* | 10/2012 | Zimmerman | G06F 8/63 718/1 |
| 2012/0331287 A1* | 12/2012 | Bowman | H04L 9/3273 713/156 |
| 2013/0061293 A1* | 3/2013 | Mao | G06F 21/53 726/4 |
| 2013/0074168 A1 | 3/2013 | Hao et al. | |
| 2013/0097296 A1* | 4/2013 | Gehrmann | G06F 9/4856 709/223 |
| 2013/0198743 A1* | 8/2013 | Kruglick | G06F 9/45533 718/1 |
| 2013/0238785 A1* | 9/2013 | Hawk | G06F 9/5072 709/224 |
| 2013/0290694 A1* | 10/2013 | Civilini | H04L 41/0806 713/2 |
| 2013/0311768 A1 | 11/2013 | Fosmark et al. | |
| 2014/0059226 A1* | 2/2014 | Messerli | G06F 9/5072 709/226 |
| 2014/0101446 A1* | 4/2014 | Lekies | H04L 9/3226 713/169 |
| 2014/0282889 A1* | 9/2014 | Ishaya | H04L 63/08 726/4 |
| 2015/0052359 A1* | 2/2015 | Castillo | H04L 63/061 713/171 |
| 2015/0116084 A1 | 4/2015 | Yeara | |
| 2015/0121070 A1 | 4/2015 | Lau et al. | |
| 2015/0135272 A1 | 5/2015 | Shah et al. | |
| 2015/0143125 A1* | 5/2015 | Nix | H04W 4/70 713/171 |
| 2015/0271159 A1* | 9/2015 | Springer | G06F 7/588 713/171 |
| 2015/0319149 A1* | 11/2015 | Alshammari | H04L 9/0869 713/171 |
| 2015/0365399 A1 | 12/2015 | Biswas et al. | |
| 2016/0087981 A1 | 3/2016 | Dorresteijn | |
| 2016/0112869 A1* | 4/2016 | Lee | H04W 12/06 713/171 |
| 2016/0127903 A1* | 5/2016 | Lee | H04W 84/12 713/171 |
| 2016/0197922 A1* | 7/2016 | Laitinen | H04L 63/06 713/171 |
| 2016/0286391 A1 | 9/2016 | Khan | |
| 2016/0373418 A1* | 12/2016 | Stahl | G06F 21/33 |
| 2017/0006034 A1* | 1/2017 | Link, II | H04L 61/2592 |
| 2018/0278607 A1 | 9/2018 | Loladia et al. | |

OTHER PUBLICATIONS

Perrin, "Noise Protocol Framework," PowerPoint Presentation, 58 pages.

Perrin, "The Noise Protocol Framework," Jul. 11, 2018, retrieved on May 31, 2019, from https://noiseprotocol.org/noise.html, 64 pages.

Wikipedia, "Double Ratchet Algorithm," Nov. 16, 2016, retrieved on Nov. 17, 2016, from https://en.wikipedia.org/wiki/Double_Ratchet_Algorithm, 4 pages.

* cited by examiner

LIGHTWEIGHT ENCRYPTED COMMUNICATION PROTOCOL

CROSS REFERENCE TO RELATED APPLICATIONS

This application is a divisional of U.S. patent application Ser. No. 15/360,862, filed Nov. 23, 2016, now U.S. Pat. No. 10,192,223 entitled "LIGHTWEIGHT ENCRYPTED COMMUNICATION PROTOCOL," the disclosure of which is incorporated herein by reference in its entirety. This application also incorporates by reference for all purposes the full disclosure of now co-pending U.S. patent application Ser. No. 15/360,871, filed Nov. 23, 2016, entitled "LIGHTWEIGHT AUTHENTICATION PROTOCOL."

BACKGROUND

An increasing number and variety of devices are being connected to computer networks. In addition to personal computers and server computer systems, non-traditional computing devices such as automobiles, wristwatches, home appliances, home-automation devices, sensors, health monitors, biometric sensors, and wearable devices are also being connected to computer networks. Some of the devices being connected to the computer networks are small, low-cost, or have limited battery power and, therefore, may have limited processing power and/or memory. The lack of processing power and/or memory makes it difficult to implement cryptographically protected protocols that utilize substantial memory and processing power.

BRIEF DESCRIPTION OF THE DRAWINGS

Various techniques will be described with reference to the drawings, in which.

DETAILED DESCRIPTION

Figure 1:
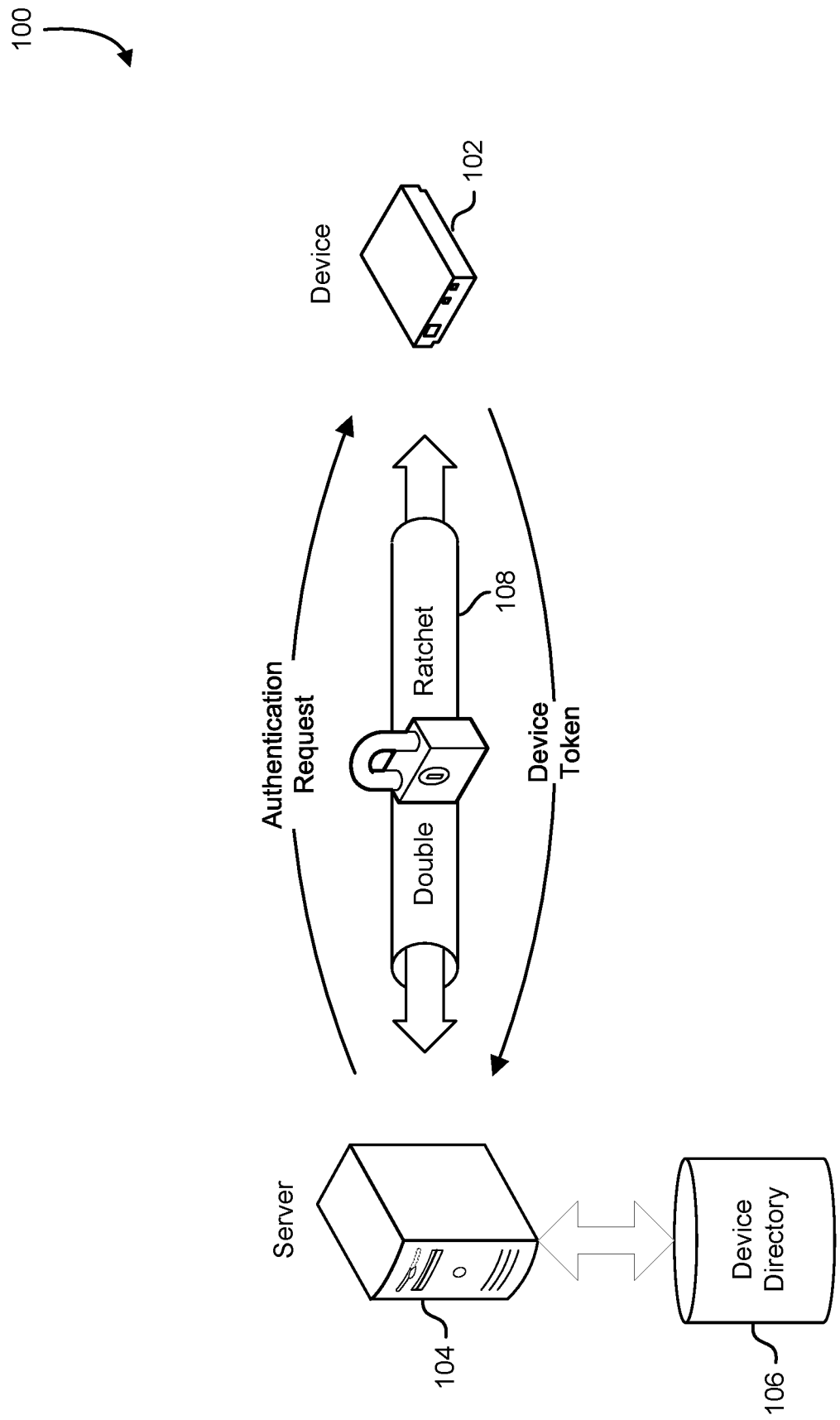
FIG. 1 shows an illustrative example of an environment in which various embodiments may be practiced.

The current document describes a lightweight network protocol that can be used to provide a protected communication channel between a server and a client device. A shared secret is established between the server and the client device using a Diffie-Hellman ("DH") key exchange. Both the server and the client device use a key-derivation algorithm to generate a symmetric encryption key from the shared secret. The symmetric encryption key is used to transmit a message between the client and the server. For successive messages sent by a single party, the server and the client derive additional symmetric keys from the shared secret, and different symmetric keys are used for each successive message. When the server and the client device exchange information, a new Diffie-Hellman key exchange is performed and the shared secret is refreshed with a new shared secret.

In some examples, a new Diffie-Hellman key exchange will be initiated after a threshold number of messages are transmitted from one party to the other party without a corresponding response. The new Diffie-Hellman key exchange may be initiated by the receiver by generating an acknowledgement message. The acknowledgement message includes key-exchange parameters that allows the sender to complete a Diffie-Hellman key exchange thereby producing a new shared secret.

The network protocol provides for the mutual authentication of the server and client device. The client device is initialized with a token, cryptographic key, or digital certificate called a birth certificate. The birth certificate may be provided by the manufacturer of the client device when the client device is made, by a vendor when the client device is shipped, or by a customer prior to deploying the client device on a customer network. When a new client device is connected to the customer network, the client device connects to a device registration service running on a device registration server. The client device presents the birth certificate to the registration service, and the registration service provides a token to the client device which may be used to authenticate the client device. The client device provides registration information to the registration service, and the registration server retains the registration information in association with the token. In some examples, the birth certificate is a cryptographic key pair. In other examples, the birth certificate is a password, a symmetric cryptographic key, or token. In yet other examples, the birth certificate is a digital certificate and the corresponding private cryptographic key maintained on the client device. In some implementations, the birth certificate is provided to the registration service by the client device, and the registration service compares the birth certificate to a matching birth certificate maintained on the registration server. In another implementation, the registration service provides a challenge message to the client device, and the client device uses the birth certificate to cryptographically sign the challenge, and the signed challenge is returned to the registration service to prove that the client device is in possession of a valid birth certificate.

The token issued by the registration service may include a symmetric cryptographic key, a cryptographic key pair, a token, or an identifier that is associated with the client device. When the client device establishes a connection with another network entity, the client device uses the token to authenticate with the other network entity. The other network entity may be another service on the registration server, or another computer system that accesses the registration server to obtain information associated with the client device. In some examples, the registration server hosts a directory service to provide registration information to network entities that wish to communicate with the client device. For example, if the other network entity is a computer system separate from the registration server, the other network entity may authenticate with the directory service using digital certificates, multifactor authentication, biometrics, conventional usernames and passwords, or other authentication method. Once the other network entity is authenticated, the directory service authorizes the other network entity and may provide directory information and the token to the other network entity. In some examples, the other network entity contacts the client device, acquires a signed a challenge from the client device, and submits the signed challenge to the directory service for validation.

In some examples, the client device provides the token to the other network entity, and the other network entity queries the directory service to confirm the identity of the client device. In another example, the other network entity issues a challenge to the client device, and the client device signs the challenge. The signed challenge is returned to the other network entity by the client device. The other network entity verifies the signature of the challenge to authenticate the client device. The other device may be authenticated using a token which is provided to the client device during the registration process, or using a digital certificate which is signed by a trusted certificate authority.

Various implementations of the protocol are particularly useful for connecting mobile devices, sensors, wearable devices, or other small devices where the amounts of computing resources are limited. Various implementations are described that provide mutual authentication and encryption, but generally require fewer resources than implementations relying upon transport layer security ("TLS") for encryption and digital certificates for authentication. In various examples, this application refers to Diffie-Hellman key exchanges. Elliptic curve Diffie-Hellman key exchanges, using either static or ephemeral public keys, may also be used.

FIG. 1 shows an illustrative example of an environment in which various embodiments may be practiced. A system diagram 100 shows a network-connected device 102 in communication with a server 104 via a protected network connection 108. The network-connected device 102 may be a handheld device, a wearable device, a remote sensor, a home appliance, a wireless peripheral, a network-connected camera, a smart home device such as a network-connected lightbulb, wall socket, or thermostat, or other network entity. The protected network connection 108 may be established using a wired or wireless connection. In various examples, a wired connection is established using an Ethernet interface, a USB interface, a FireWire interface, a serial interface, a powerline interface, or a fiber-optic interface. In additional examples, a wireless connection is established between the network-connected device 102 and the server 104 using a Wi-Fi, 802.11, or Bluetooth interface.

As part of installation, the network-connected device 102 registers with a registration service running on the server 104. The server 104 maintains a database of information in a device directory 106. The device directory 106 may be stored on a storage service accessible to the server 104 or on a storage device connected internally or externally to the server 104. When the network-connected device 102 is initially connected to a network, the network-connected device 102 locates the registration service running on the server 104. The network-connected device 102 may locate the registration service by sending a broadcast message over the network, or by listening on a particular network port for a broadcast message sent from the registration service. After locating the registration service, the network-connected device 102 establishes a logical connection to the registration service and performs a key exchange to establish a shared secret. The shared secret is used as a cryptographic key to encrypt further communication between the network-connected device and the registration service. In some implementations, the network-connected device 102 provides a birth certificate in the form of a token, a digital signature, cryptographic key, or password, to the directory service. In one example, the birth certificate is a private cryptographic key of a public-private key pair, and the registration service submits a challenge to the network-connected device 102. The network-connected device 102 signs the challenge with the private cryptographic key, and returns the signed challenge to the registration service.

The registration service attempts to confirm that the birth certificate submitted by the network-connected device 102 is valid. In some examples, the birth certificate is confirmed by comparing a token, a password, or identifier supplied by the manufacturer of the network-connected device 102 to a corresponding value provided by the network-connected device 102. In another example, the birth certificate is confirmed by validating a digital signature or signed challenge provided by the network-connected device 102 using a public cryptographic key supplied by the manufacturer of the network-connected device 102. In another example, the birth certificate is signed by a trusted authority, and the validity of the birth certificate is confirmed by validating the digital signature on the birth certificate using a store of trusted cryptographic keys associated with a set of trusted authorities. If the birth certificate is not valid, the registration service does not register the device. If the birth certificate is valid, the registration service collects device information from the network-connected device 102, and stores the device information in the device directory 106. The registration service generates a token for the network-connected device 102 that may be used to authenticate the identity of the network-connected device 102 when communicating with other network entities. The token is stored in the device directory 106 in association with the device information. The registration service encrypts the token with the shared secret, and sends the encrypted token to the network-connected device 102. The network-connected device 102 decrypts the encrypted token using the shared secret, and retains the token for later use.

Once the network-connected device 102 is registered with the registration service, other services on the server 104, or other network entities that wish to communicate with the network-connected device 102, may use the token and information in the device directory 106 to authenticate the network-connected device 102. When a service or network entity establishes a connection to the network-connected device 102, the network-connected device 102 provides authentication information based on the token received during the registration process. In some examples, the network-connected device 102 provides the token as proof of registration and identity. In another example, the network-connected device 102 uses the token as a cryptographic key to sign a challenge, and returns the signed challenge as proof of registration and identity. In some examples, the service or network entity verifies the proof of registration by acquiring the token from the device directory 106 and determining that the token provided matches the corresponding token in the device directory 106. In another example, the service or network entity submits the proof of registration provided by the network-connected device 102 to a directory service hosted on the registration server, and the directory service indicates to the service or network entity whether the proof of registration is valid.

Communications between the network-connected device 102 and other network entities are protected by encrypting information sent over a logical network connection with a cryptographic key. The cryptographic keys updated as messages are exchanged between the network-connected device 102 and the other network entity. After the logical network connection is established, the network-connected device 102 and the other network entity perform a Diffie-Hellman key exchange to establish a shared secret. Both the network-connected device and the other network entity derive a new cryptographic key from the shared secret, and the new cryptographic key is used to encrypt and decrypt the first message exchanged between the parties. Each time a message is sent or received, a new cryptographic key is derived from the shared secret. Both parties derive new keys from the same shared secret in the same sequence and, therefore, the new cryptographic keys match. New cryptographic keys may be derived from the shared secret using a cryptographic hash function, one-way function, key derivation function, linear feedback shift register, or seeded pseudorandom number generator. In one implementation, a new cryptographic key is generated by computing a cryptographic hash of the shared secret and the cryptographic key used to encode and decode the previous message.

When a message is sent from one party to another, the sending party includes a set of parameters for a new Diffie-Hellman negotiation with the message. In some examples, the set of parameters for the new Diffie-Hellman negotiation is sent with every message. In other examples, additional sets of parameters are not sent until the recipient responds to the previous set of parameters. If the recipient returns a reply to the sender, the recipient includes a response to the set of parameters for the new Diffie-Hellman negotiation, allowing both the sender and the recipient to generate a new shared secret. In some examples, the recipient may include a second set of parameters for a second new Diffie-Hellman negotiation with the reply. When a new shared secret is established, key derivation for successive messages uses the new shared secret. In various implementations, the renegotiation of the shared secret combined with the derivation of new cryptographic keys for each message provides forward secrecy and a self-healing capability should a particular cryptographic key become compromised.

In some implementations, the methods described in the current document may be used to provide symmetric keys for encryption and authentication, since encryption, signing, and verification using symmetric keys generally use less memory and processing power than asymmetric keys. The methods described in the current document are particularly well-suited to embedded devices, network-connected sensors, biometric sensors, and other environments where computing resources are constrained.

Figure 2:
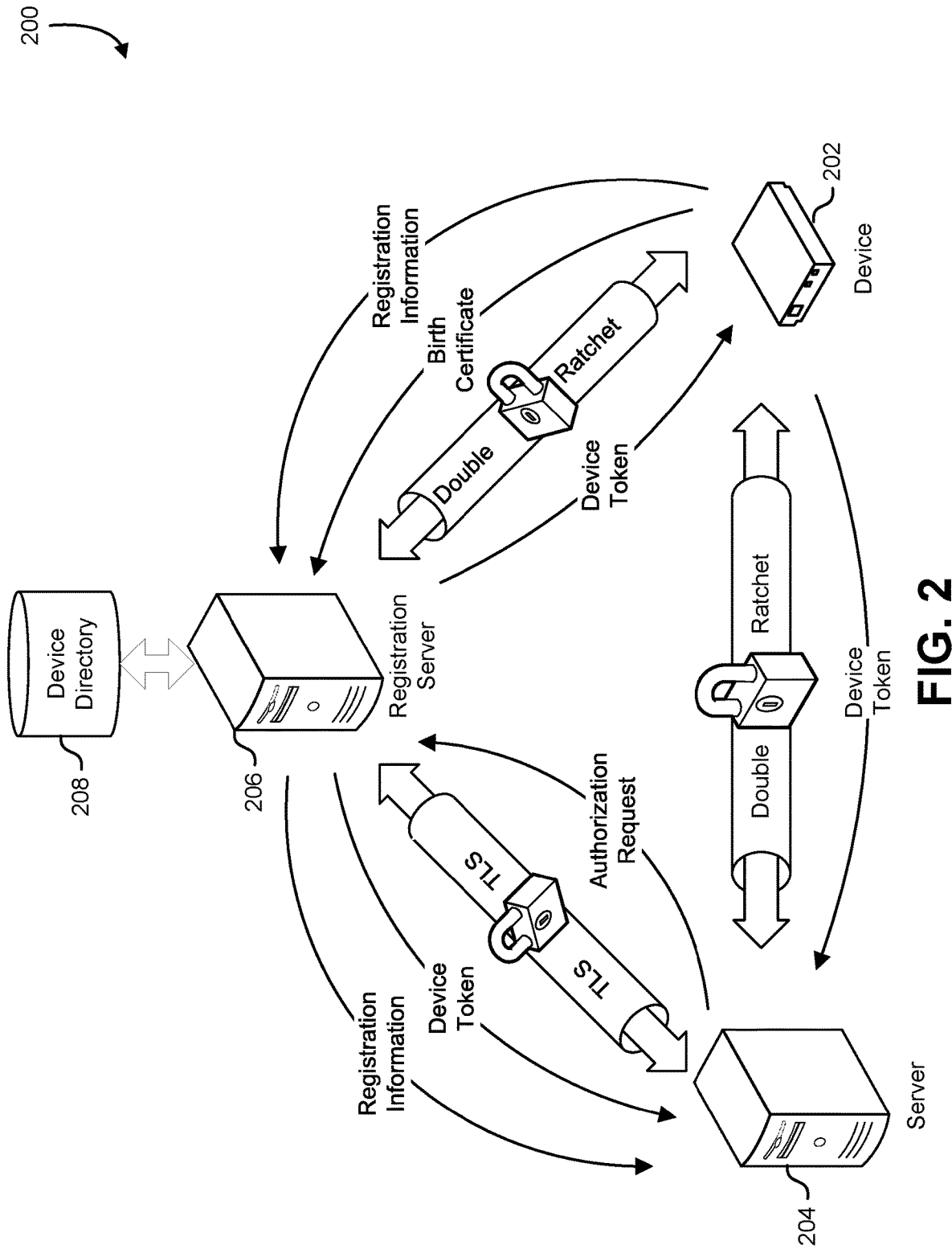
FIG. 2 shows an illustrative example of a device registration server that issues a registration token to a device, and a server that uses the token to authenticate the device.

FIG. 2 shows an illustrative example of a device registration server that issues a registration token to a device, and a server that retrieves the token from the device registration server and uses the token to authenticate the device. A diagram 200 shows a device 202 that is connected to a server 204 and a registration server 206 via a computer network. In many examples, the device 202 is a device that operates with a limited amount of computing resources. Computing resources may be limited due to limited availability of power, cost, physical size, or other constraints. The computer network may be a wired network, a wireless network, or combination of wired and wireless networks. The registration server 206 is connected to the network and hosts a registration service and a directory service. The registration service collects information from the device 202 during the registration process and stores the registration information in a device directory 208. The directory service processes requests from other network entities to access information in the device directory 208. The device directory 208 is maintained on a storage device connected to the registration server 206. In various implementations, the storage device is an internal disk drive, a nonvolatile memory, or network attached storage system. The server 204 acquires the information associated with the device 202 from the registration server 206 and uses the information to establish a communication channel with the device 202.

A memory in the device 202 retains a birth certificate. In various examples, the birth certificate is a digital certificate, token, password, or cryptographic key provided by a manufacturer or other responsible entity that may be used to authenticate the device. The birth certificate may be provided to the device 202 in a variety of ways. In some examples, the birth certificate is a cryptographic key or cryptographic key pair under the control of the manufacturer of the device 202, and the birth certificate is written to the device 202 at the time of manufacture. In another example, the birth certificate is written to the device 202 by a network or system administrator before installing the device 202 on the network. In some examples, the birth certificate is installed using removable media such as an SD card, memory stick, USB memory stick, or flash memory device. In other examples, the birth certificate is installed by connecting the device 202 to a host computer system via a USB, FireWire, or serial connection, and providing the birth certificate over the USB, FireWire, or serial connection.

When connected to the network, the device 202 performs a registration process with the registration server 206. The device 202 establishes an encrypted network connection with the registration server 206. In some examples, the encrypted network connection is established using a transport layer security ("TLS") connection. In other examples, the encrypted network connection is established by negotiating a symmetric key using a key exchange algorithm. In yet another example, the encrypted network connection is established using a double-ratchet method such as the method shown and described in FIG. 6 and FIG. 7 and the related description. The device 202 provides the birth certificate to the registration server 206. In some examples, the birth certificate is sent from the device 202 to the registration server 206 to authenticate the device for registration. In another example, the birth certificate is provided in the form of a digital signature. A challenge in the form of a random value is sent from the registration server 206 to the device 202. In response to the challenge, the device 202 determines a digital signature for the challenge using a cryptographic key associated with the birth certificate. The digital signature is returned to the registration server 206, and the registration server 206 confirms that the digital signature is valid. In some implementations, the digital signature is generated using a private cryptographic key of a public-private key pair, and the registration server 206 confirms that the digital signature is valid using a public key of the public-private key pair. In another implementation, the digital signature is generated using a symmetric cryptographic key, and the registration server 206 confirms that the digital signature is valid by obtaining a matching signature from an owner of the cryptographic key.

If the device 202 provides proof of a valid birth certificate to the registration server 206, the registration server 206 generates a device token to be associated with the device 202. The device token is stored in the device directory 208 and provided to the device 202. The device 202 retains the device token, which may be used to identify and authenticate the device 202 in additional communications sessions. The device 202 provides a set of registration information to the registration server 206. The registration information may include device configuration information, device serial numbers, device status information, or network-address information associated with the device 202. The registration server 206 stores the registration information in association with the token in the device directory 208.

To initiate a connection with the device 202, the server 204 first establishes a TLS connection with the registration server 206. The server 204 and the registration server 206 may perform mutual authentication using digital certificates, multifactor authentication, biometrics, usernames and passwords, or other mechanisms. After authenticating the identity of the server 204, the registration server 206 determines whether the server 204 is authorized to communicate with the device 202. The registration server 206 may determine whether the server 204 is authorized to communicate with the device by authenticating the identity of the server 204 using a digital certificate, a username and password pair, multifactor authentication process, or other method, and consulting an authorization database. If the server 204 is authorized to communicate with the device 202, the registration server provides information related to the device 202 to the server 204. In some implementations, the registration server 206 provides the device token and the registration information to the server 204. In other implementations, the registration server 206 provides a digital signature or cryptographic key related to the device token. In one example, the information related to the device token is a digital signature generated with a cryptographic key that is generated using a key derivation function from the device token. The server 204 uses the registration information and other information related to the device, which may contain network-address information, to contact the device 202 and establish an encrypted connection using a double-ratchet protocol.

The identity of the server 204 and/or the device 202 may be authenticated using the device token or information related to the device token. In some examples, the device 202 provides the device token to the server, and the server authenticates the device 202 by confirming that the token provided by the device 202 matches the token provided by the registration server 206. In another example, the server 204 issues a challenge in the form of a random number to the device 202. The device 202 uses a cryptographic key derived from the device token to generate a digital signature of the challenge and returns the digital signature to the server 204. The server 204 authenticates the device 202 by validating the digital signature using the token provided by the registration server 206.

In some implementations, the registration server 206 does not provide the plaintext of the device token to the server 204. The server 204 sends a challenge to the device 202, the device 202 signs the challenge using a cryptographic key based on the device token, and returns the signed challenge to the server 204. The server 204 sends the challenge to the registration server 206, and the registration server 206 generates a matching corresponding digital signature for the challenge using a matching cryptographic key derived from the device token. The registration server returns the digital signature to the server 204, and the server 204 authenticates the device 202 by confirming that the digital signature provided by the registration server 206 matches the digital signature provided by the device 202.

The device 202 may authenticate the identity of server 204. In some examples, the server 204 provides a digital certificate, such as an X.509 certificate, to the device 202, and the device 202 uses the information in the digital certificate to confirm the identity of the server 204. In another example, the registration information or device-related information provided by the device 202 to the registration server 206 includes an authentication key. The authentication key is a cryptographic key generated by the device 202 and provided to the registration server 206. The registration server 206 secures the authentication key in the device directory 208, and the authentication key is not provided to the server 204. To authenticate the server 204, the device 202 generates a challenge message which is sent to the server 204. The server 204 provides identifying information which is added to the challenge message and forwarded to the registration server 206. The registration server authenticates the server 204 using digital certificates, multifactor authentication, or any other method, and confirms that the identifying information is correct. The registration server uses the authentication key to sign the challenge message with the identifying information and returns the signed challenge and identifying information to the server 204. The server provides the signed challenge and identifying information to the device 202, and the device 202 authenticates the server 204 by verifying the signature using the authentication key. In implementations where the device token is retained on the registration server 206 and not shared with the server 204, the device token may be used as the authentication key.

In some implementations, the device 202 confirms that the server 204 has been properly authorized by the registration server 206 without authenticating the identity of the server 204. The device token is not provided to the server 204 by the registration server 206, and the server 204 does not provide identifying information. To confirm that the server 204 has been properly authorized by the registration server 206, the device 202 submits a challenge to the server 204, which is to be signed with a cryptographic key derived from the device token. To acquire the signature, the server 204 authenticates with the registration server 206, and the registration server 206 confirms the identity of the server 204, and that the server 204 is authorized to communicate with the device 202. If the device is authorized, the server 204 relays the challenge to the registration server 206, and the registration server 206 signs the challenge with the cryptographic key derived from the device token. The signed challenge is returned from the registration server 206 to the server 204, and the server 204 relays the signed challenge to the device 202. The device 202 verifies the signature, and a valid signed challenge indicates to the device 202 that the server 204 has been authorized by the registration server 206 to communicate with the device 202.

Figure 3:
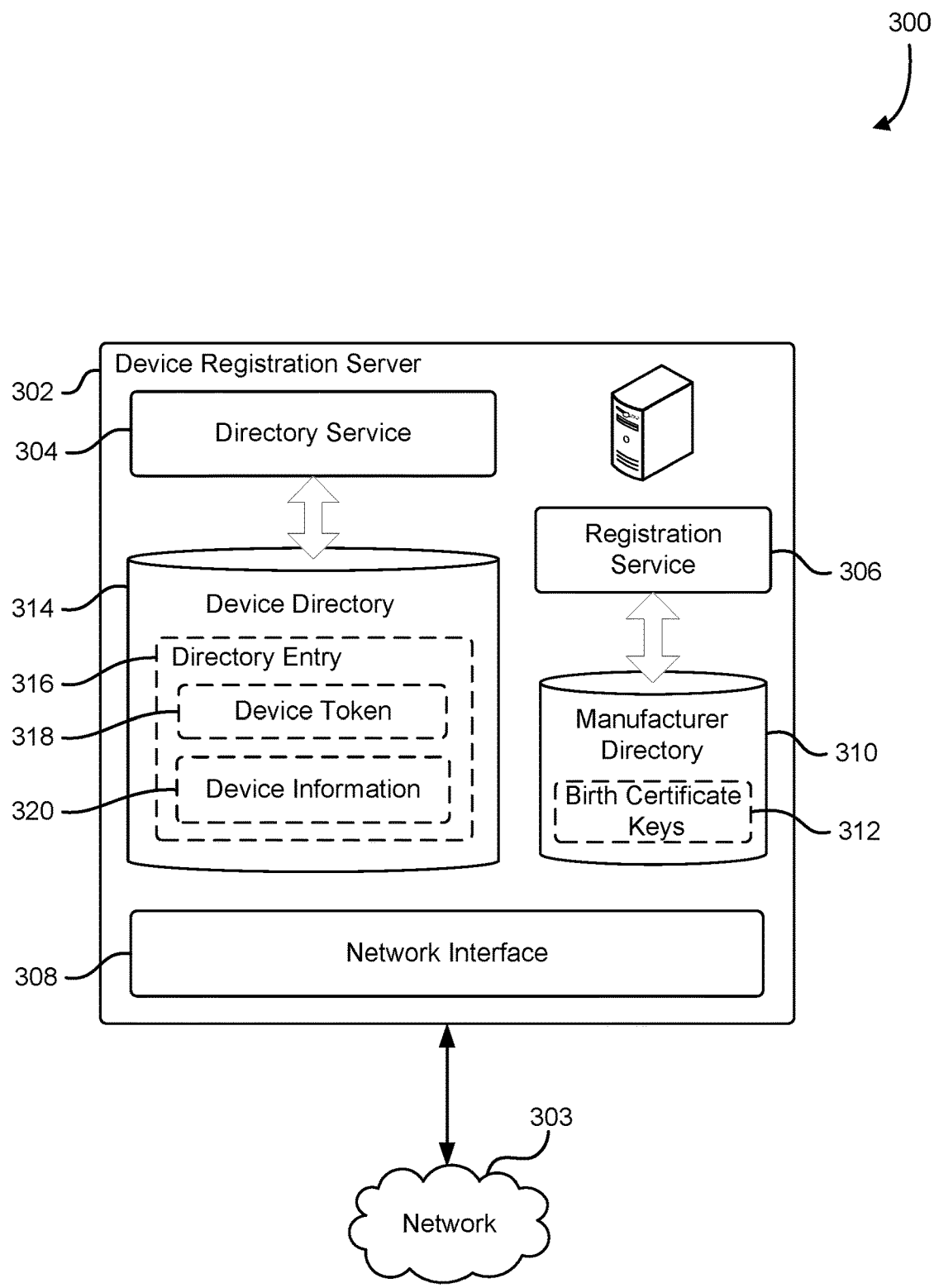
FIG. 3 shows an illustrative example of a device registration server that issues registration tokens to devices for device authentication.

FIG. 3 shows an illustrative example of a device registration server that issues registration tokens to devices for device authentication. A block diagram 300 shows a structure of a device registration server 302 connected to a network 303. The device registration server may be a computer system, computer server, server cluster, virtual computer system, or other network-connected device. In some implementations, the device registration server 302 is a network-connected appliance such as a network router, hub, or switch. The device registration server 302 includes a directory service 304 and a registration service 306. The registration service 306 processes registration requests from network-connected devices on the network 303. The registration service 306 receives the registration requests via a network interface 308 on the device registration server 302. In some implementations, the registration service 306 binds to a logical socket on the network interface 308 on the device registration server 302, and listens for registration requests on the logical socket. In another implementation, the registration service 306 periodically sends broadcast messages over the logical socket that announced the presence of the registration service 306 to network-connected devices. The directory service 304 binds to another logical socket on the network interface 308, and processes requests received from network entities to access network-connected devices that are registered with a device registration server 302.

When a new device is connected to the network 303, the new device attempts to locate the device registration server 302. In some examples, after being connected to the network 303, the new device listens for a broadcast packet from the registration service 306. If a broadcast packet from the registration service 306 is detected, network-address information in the broadcast packet identifies the registration service 306, and allows the device to send a registration request to the registration service 306. In another example, the new device broadcasts a query packet on the network 303, the registration service 306 detects the query packet and responds to the new device by providing the network-address information of the registration service 306.

After the registration service 306 is located by the new device, the new device and the registration service 306 perform a registration process that provides the device registration server 302 with device information, and provides the device with a device token for device authentication. The device registration server includes a manufacturer directory 310. The manufacturer directory 310 is a database, data store, or file on a storage device accessible to the device registration server 302. The manufacturer directory 310 holds a collection of birth certificate keys 312. In some examples, the collection of birth certificate keys is a collection of passwords, digital certificates, cryptographic keys, or tokens that are provided by various manufacturers of devices, capable of being registered with the device registration server 302. When a particular device contacts the registration service 306 and submits a registration request, the particular device provides a birth certificate to the registration service 306, and the registration service 306 attempts to locate a matching birth certificate in the collection of birth certificate keys 312. If a matching birth certificate is located in the manufacturer directory 310, the registration service 306 grants the registration request and issues a device token to the particular device.

In another example, the collection of birth certificate keys is a set of public cryptographic keys or verification-service URLs associated with various manufacturers of devices capable of being registered with a device registration server 302. When a particular device contacts the registration service 306 and submits a registration request, the registration service 306 submits a challenge message to the particular device. The particular device uses a cryptographic key associated with a birth certificate on the device to sign the challenge message, and returns the signed challenge message to the registration service 306. The registration service 306 locates a matching birth certificate in the manufacturer directory 310, and uses the information in the matching birth certificate to verify that the challenge message was properly signed by the particular device. In some implementations, the particular device signs the challenge message with the private cryptographic key, and the registration service verifies the signed challenge message using a corresponding public cryptographic key. In another implementation, the particular device signs the challenge message with a cryptographic key, and the registration service sends the signed challenge message to a verification service specified in the manufacturer directory 310. The verification service examines the signed challenge message and indicates to the registration service 306 whether the signed challenge message is valid. For example, the verification service maybe operated by the manufacturer of the particular device, and the signed challenge message may be verified using a cryptographic key controlled by the manufacturer of the particular device.

A device directory 314 is maintained on a storage device on the device registration server 302. The device directory 314 retains a collection of directory entries 316. Each directory entry contains a device token 318 and a set of device information 320. When a device is registered by the registration service 306, the device provides the registration service with device information, and the registration service generates and provides a device token to the device. The registration service 306 stores the device token in association with the device information in the device directory 314 as a directory entry in the collection of directory entries 316.

Other network entities such as computer servers, mobile devices, network appliances, cellular devices, or other client devices may connect to the directory service 304 and acquire information that allows communication with one or more registered devices. To establish communication with a registered device, a particular network entity contacts the directory service 304 on the device registration server 302 and requests device information associated with the registered device. The directory service 304 authenticates the particular network entity using digital certificates, multifactor authentication, usernames and passwords, or other techniques, and determines whether the particular network entity is authorized to contact the registered device. The device registration server 302 may maintain a database of authorized network entities that are allowed to communicate with registered devices. If the particular network entity is authorized to contact the registered device, the directory service 304 provides network-address information that allows the particular network entity to contact the registered device. In some examples, the network-address information is an IP address and network port.

The particular network entity initiates a network connection to the registered device. In some examples, communications over the network connection are encrypted using a cryptographic key. The cryptographic key may be rotated using a double-ratchet mechanism described elsewhere in this application. In some examples, the registered device provides the device token provided by the registration service 306 to the particular network entity, and the particular network entity confirms that the provided device token matches a device token provided by the directory service 304 to authenticate the device. In another example, the particular network entity provides a challenge message to the device, and the device signs the challenge message using a cryptographic key based at least in part on the device token. The signed challenge message is returned to the particular network entity, and the particular network entity validates the signature on the challenge message. The signature on the challenge message may be validated by generating a corresponding signature using a device token provided by the directory service 304. In some examples, the particular network entity submits the signed challenge message to the directory service 304, and the directory service 304 retrieves the device token from the device directory 314. The directory service 304 generates a comparison signature for the challenge message using a cryptographic key based at least in part on the device token retrieved from the device directory 314, and if the comparison signature matches the signature provided by the particular network entity, the directory service 304 indicates to the particular network entity that the signed challenge message is valid.

In some examples, the registered device authenticates the identity of the particular network entity that is attempting to communicate with the registered device. In some implementations the registered device requests a digital certificate from the particular network entity, confirms a digital signature generated with a private key corresponding to a public key included with the digital certificate, and confirms that the digital certificate is signed by a certificate authority ("CA") trusted by the registered device. A trust store containing cryptographic keys associated with trusted certificate authorities may be maintained on the registered device for this purpose. In some implementations, the trust store is written to the registered device during the registration process, and a list of trusted certificate authorities is provided by the registration service 306 with the device token. In another implementation, the registered device authenticates the particular network entity by sending a challenge message to the particular network entity. The network entity signs the challenge message using the device token and returns the signed challenge message to the registered device. In yet another implementation, the registered device authenticates the particular network entity by sending a challenge message to the particular network entity. The network entity sends the challenge message to the directory service 304 which, after authenticating the particular network entity, signs the challenge message using the device token of the registered device and provides the signed challenge message to the particular network entity. The particular network entity relays the signed challenge message to the registered device to prove that the particular network entity has been authenticated by the device registration server 302.

Figure 4:
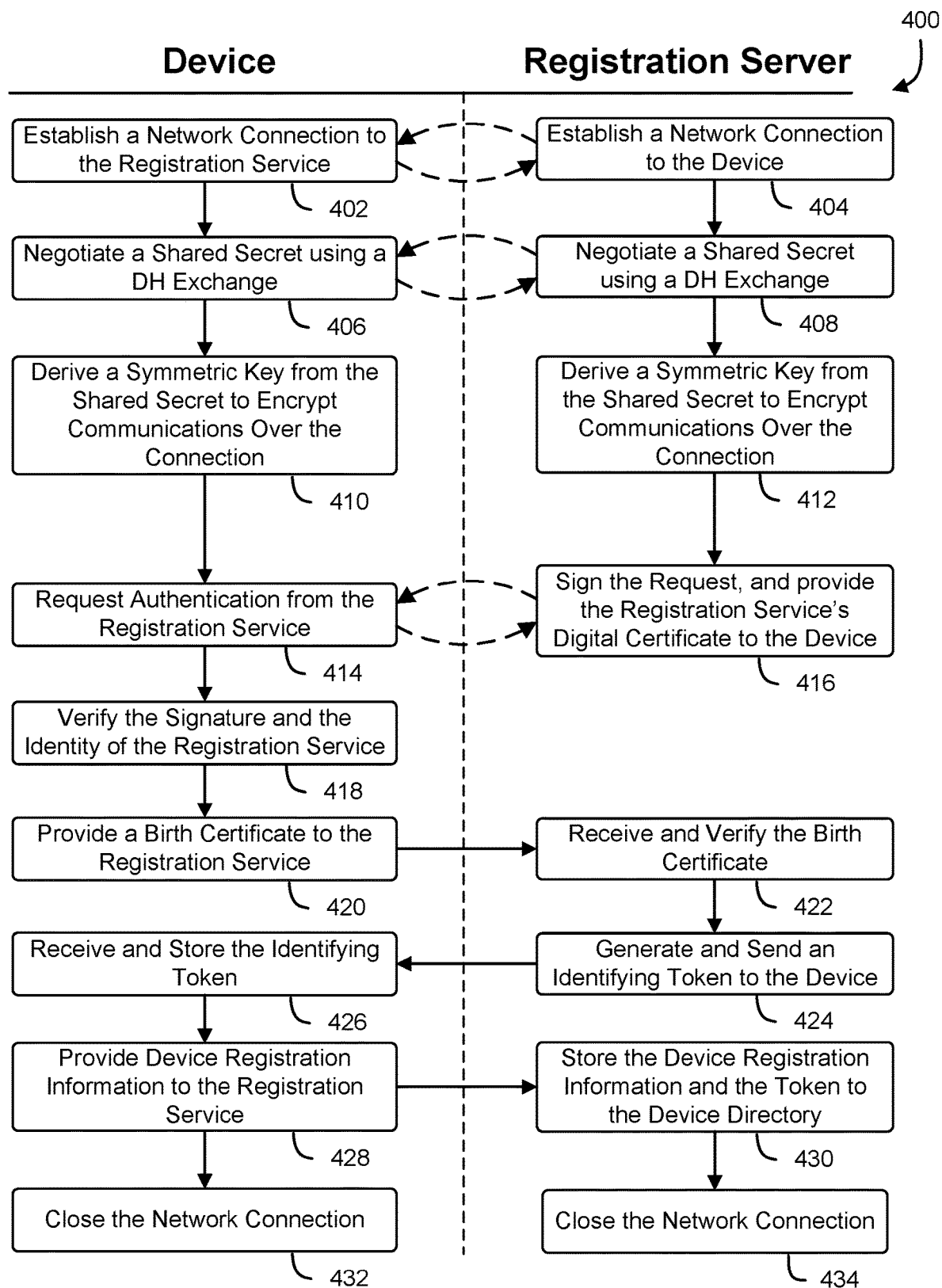
FIG. 4 shows an illustrative example of a process that, as a result of being performed by a device and a registration server, retrieves registration information from the device, stores the information on the registration server, and provides the device with an identifying token.

FIG. 4 shows an illustrative example of a process that, as a result of being performed by a device and a registration server, retrieves registration information from the device, stores the information on the registration server, and provides the device with an identifying token. A swim diagram 400 illustrates a process that begins at block 402 with the device initiating a logical network connection to a registration service running on a registration server. The registration service responds 404 to the device to acknowledge the creation of a logical connection. In some examples, the logical network connection is established as a reliable connection on top of a packet-based network using a protocol such as TCP. In other examples, the logical network connection is established using a packet-based protocol such as UDP.

Figure 8:
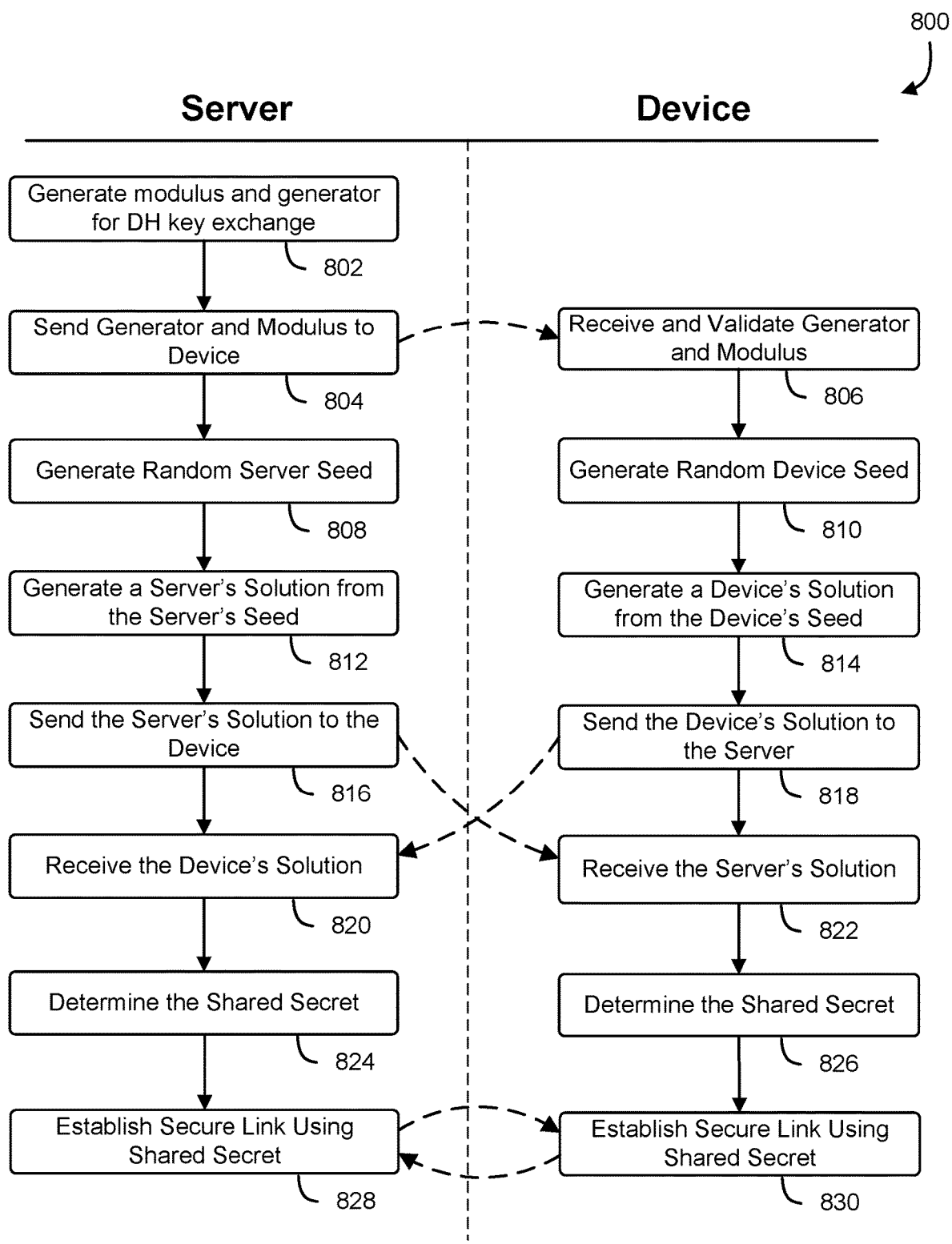
FIG. 8 shows a first part of an illustrative example of a process that, as a result of being performed by a device and a server, generates a shared secret using a Diffie-Hellman key change process.

At blocks 406 and 408, the device and the registration service negotiate a shared secret using a key exchange algorithm such as a Diffie-Hellman, elastic curve Diffie-Hellman, or Merkel key exchange. An example of a Diffie-Hellman key exchange algorithm is shown in FIG. 8. After completing the key exchange algorithm, both the device and the registration service are in possession of a shared secret. At block 410, the device derives a symmetric cryptographic key from the shared secret using a key derivation algorithm, cryptographic hash, or one-way function. At block 412, the registration server uses a matching algorithm to derive a symmetric key that matches the symmetric key derived by the device. The device and the registration server use the derived symmetric cryptographic keys to encrypt and decrypt further communications sent over the logical connection.

At block 414, the device submits an authentication request to the registration service. The authentication request includes a challenge message to be signed by the registration server. The challenge message may be a random number, alphanumeric string, or data block. The registration service receives 416 the authorization request and signs the authorization request with a private cryptographic key owned by the registration service. The registration service returns the signed authorization request along with a digital certificate that is signed by a certificate authority. The digital certificate includes a public graphic key corresponding to the private cryptographic key used to sign the challenge message. The device uses the public cryptographic key in the signed digital certificate to verify 418 the signature on the authorization request, and verifies that the digital certificate is signed by a certificate authority that is trusted by the device.

If the identity of the registration service is authentic, and the device approves the use of the registration service for registering the device, the device provides 420 a birth certificate to the registration service. The birth certificate may be a token, password, cryptographic key, or digital signature. In some examples, the birth certificate is written to the device by the device manufacturer, and information sufficient to verify the birth certificate is published by the manufacturer to purchasers of the device. At block 422, the registration server receives the birth certificate from the device. The registration server verifies the birth certificate provided by the device. In some examples, the birth certificate is verified by submitting the birth certificate to a verification service operated by the device manufacturer. In other examples, the birth certificate is verified by confirming a digital signature provided by the device with a public key provided by the device manufacturer. In yet another example, the birth certificate is verified against a database of birth certificates maintained by the registration server and accessible to the registration service.

If the birth certificate is valid, the registration server determines that the device is authentic and may be registered. At block 424, the registration server generates a device token. The device token may be a number, alphanumeric string, identifier, globally unique identifier ("GUID"), or cryptographic key. Each active device registered with the registration service is issued a different device token. The device token is sent to the device. At block 426, the device receives the device token and stores the device token in a memory on the device. At block 428, the device generates registration information and sends the registration information to the registration service. The registration information may include network-address information of the device, firmware and software versions of the device, model numbers of the device, and device configuration information. The registration service receives the registration information and stores 430 the registration information in association with the device token in a device directory on the registration server. At blocks 432 and 434, the device and the registration service close the network connection and the device registration process is complete.

Figure 5:
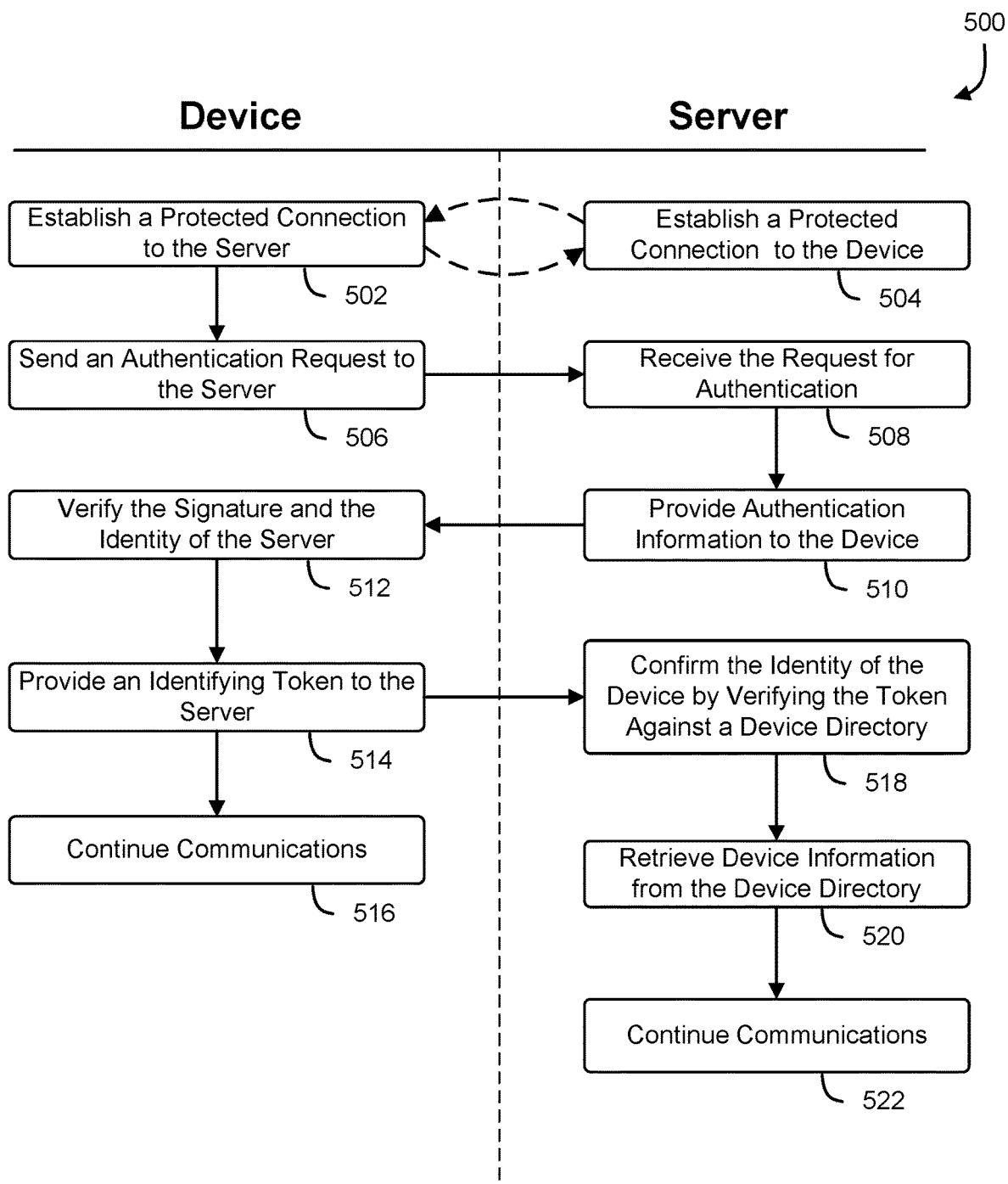
FIG. 5 shows an illustrative example of a process that, as a result of being performed by a device and a server, establishes mutual authentication of the server and the device.

FIG. 5 shows an illustrative example of a process that, as a result of being performed by a device and a server, establishes mutual authentication of the server and the device. A swim diagram 500 illustrates a process that begins at blocks 502 and 504 with the device and the server establishing a protected connection with each other. The protected connection may be protected using encryption. In some examples, a TLS connection is used to establish a protected connection. In other examples, an encrypted connection using a double-ratchet protocol is used to establish the protected connection. Further communications between the device and the server occur over the protected connection.

At block 506, the device sends an authentication request to the server. The server receives 508 the request for authentication from the device. The request for authentication may include data to be signed by the server. At block 510, the server generates authentication information to submit to the device. The authentication information may be an X.509 digital certificate, a digital signature, a password, a token, or cryptographic key. In some examples, the server generates a digital signature using a cryptographic key that is based at least in part on the device token associated with the device and submits the digital signature to the device as authentication information. At block 512, the device receives the authentication information from the server. The device verifies the authenticity of the authentication information. In some examples, the device verifies the authenticity of the authentication information by validating a digital signature. In other examples, the device verifies the authenticity of the authentication information by validating a digital certificate in accordance with the X.509 standard.

After the device has authenticated the identity of the server, the device retrieves an identifying token provided by a registration service as part of a registration process from a memory on the device. The device provides 514 the identifying token to the server. At block 516, the device's portion of the authentication process is complete. At block 518, the server receives the identifying token and confirms the token received from the device against a token retrieved from a device directory on a registration server. Using the token, the server retrieves 520 device information from the device directory. The device information may include device configuration, device parameters, or other device information provided by the device during the registration process. At block 522, the server's portion of the authentication process is complete, and the server has authenticated the identity of the client. At block 516 and block 522, the device and the server may continue exchanging messages over the protected connection.

Figure 6:
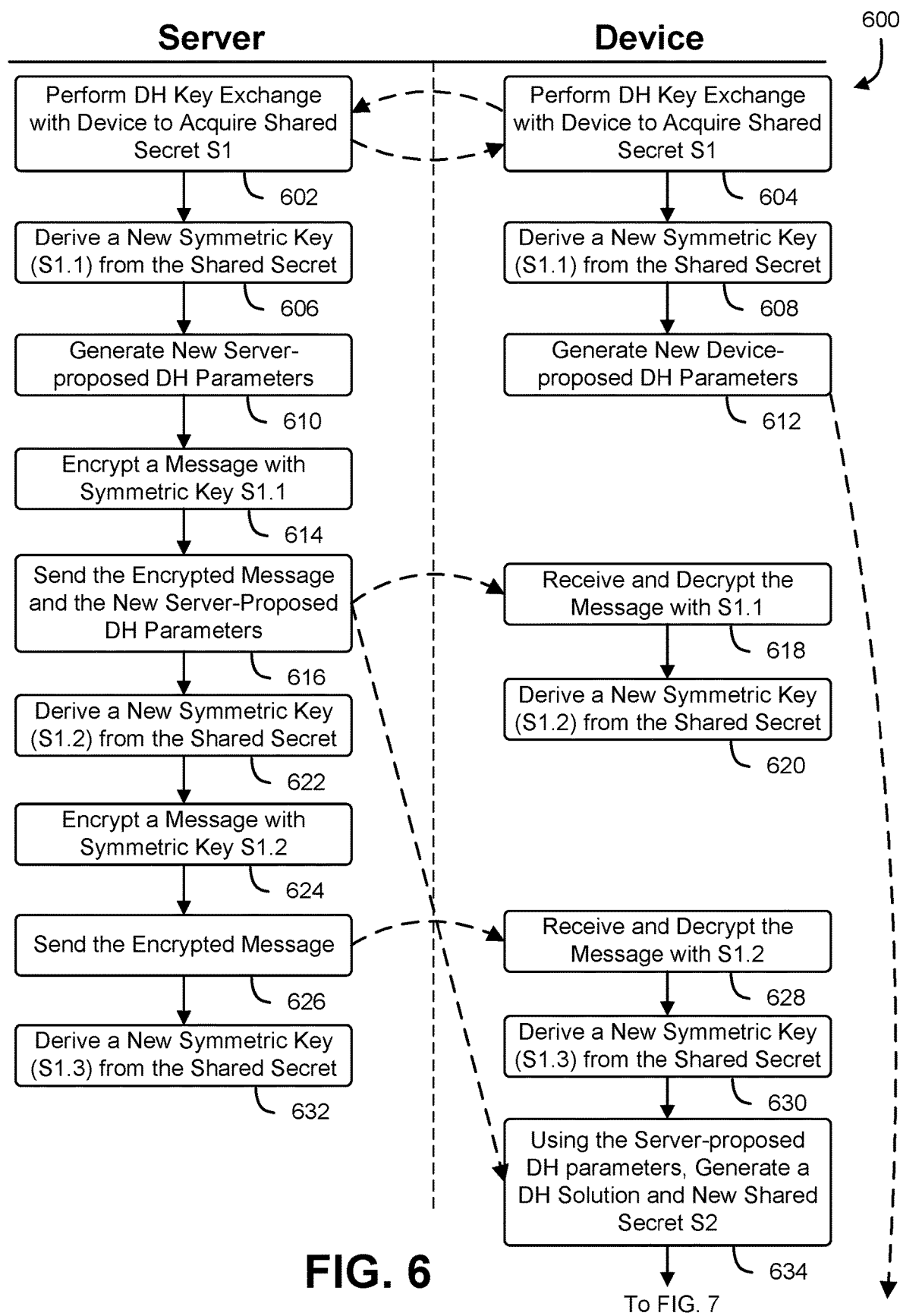
FIG. 6 shows a first part of an illustrative example of a process that, as a result of being performed by a device and a server, performs a message exchange over a protected communication channel using cryptographic keys that are generated with a double-ratchet method.

FIG. 6 shows a first part of an illustrative example of a process that, as a result of being performed by a device and a server, performs a message exchange over a protected communication channel using cryptographic keys that are generated with a double-ratchet method. A swim diagram 600 illustrates a process that begins at blocks 602 and 604 with the server and a device performing a Diffie-Hellman key exchange to acquire a shared secret. In various examples, other key exchange algorithms may be used such as Elliptic Curve Diffie-Hellman ("ECDH"), Ephemeral ECDH ("ECDHE") key exchange algorithms. If elliptic curve cryptography is used, the elliptic curves may be generated by the server and the device or chosen from a number of predefined curves such as Brainpool, IEEE P1367, NIST, NSA Suite B, or ANSI X9.63. Additional key-exchange methods that involve an exchange of information that enables both parties to mathematically derive a shared secret not readily discernable to an eavesdropper may also be suitable. Methods that produce a shared secret between two or more parties may be used to enable each party can derive matching cryptographic keys.

At blocks 606 and 608, the server and the device each derive matching new symmetric keys from the shared secret key. The matching new symmetric keys are derived using matching key derivation functions, cryptographic hashes, or one-way functions. At block 610, the server generates a new set of proposed Diffie-Hellman key-exchange parameters. The key-exchange parameters are based at least in part on the key-exchange algorithm used, but may include a prime number, a generator, an elliptic curve, and a challenge. The challenge is a combination of a server-generated secret and the key-exchange parameters, as defined by the chosen key-exchange algorithm. At block 612, the device generates a new set of proposed Diffie-Hellman key-exchange parameters. The key-exchange parameters are based at least in part on the key-exchange algorithm used, and may include a prime number, and generator, an elliptic curve, and a challenge. The challenge is a combination of a device-generated secret and the key-exchange parameters, as defined by the selected key-exchange algorithm.

Figure 9:
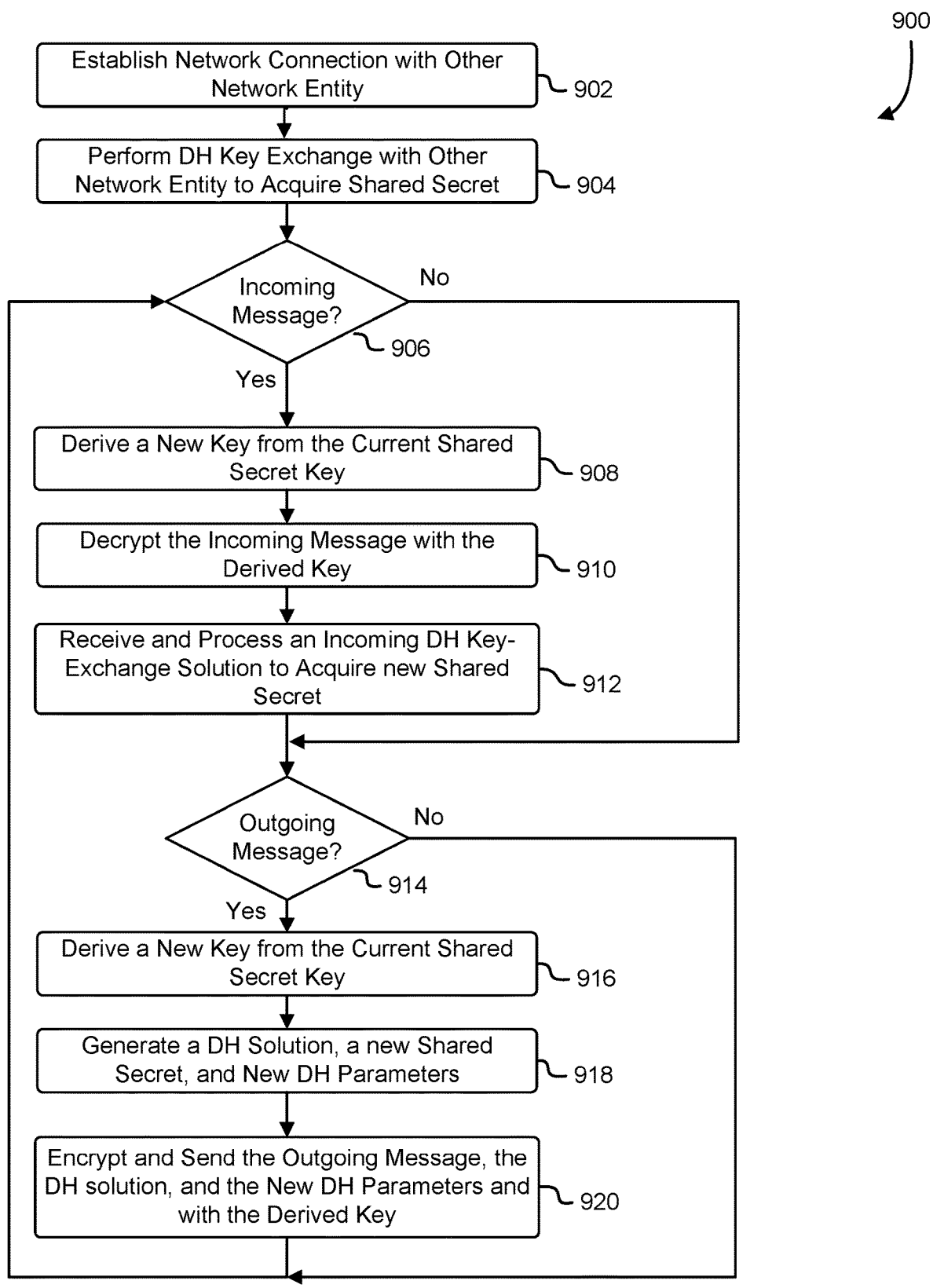
FIG. 9 shows an illustrative example of a process that, as a result of being performed by a network device, manages communications with another network entity using a double ratchet protocol.
Figure 10:
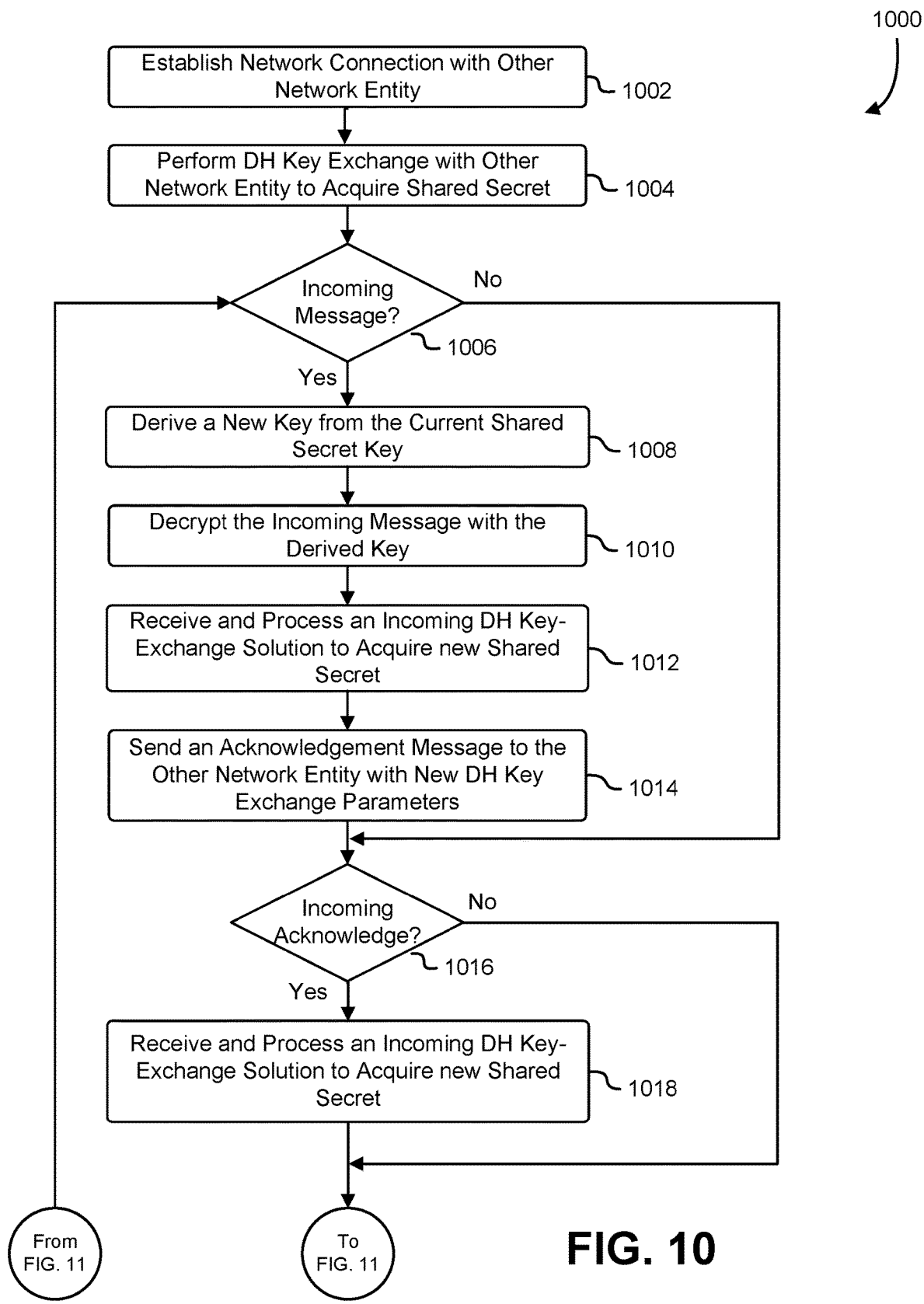
FIG. 10 shows a first part of an illustrative example of a process that, as a result of being performed by a network device, provides message acknowledgements in response to incoming messages.
Figure 11:
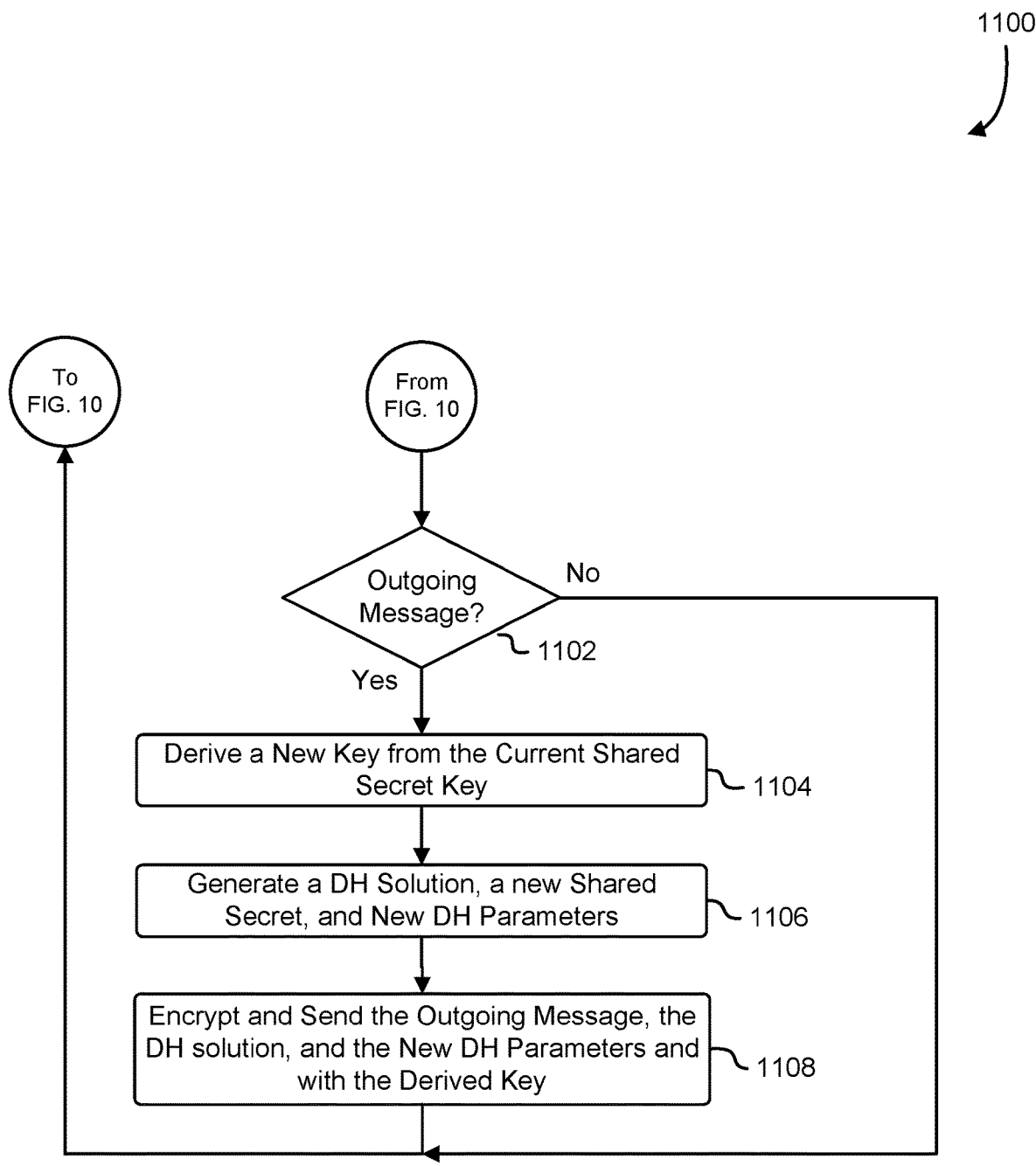
FIG. 11 shows a second part of an illustrative example of a process that, as a result of being performed by a network device, provides message acknowledgements in response to incoming messages.

At this point in the process, both the server and the device have agreed on a shared secret (S1). Both the server and the device have generated key-exchange parameters that could be used to create a new shared secret if sent to the other party, and the other party responds with an appropriate key-exchange response. Both parties have derived a matching symmetric key (S1.1) that is derived from the shared secret. The device and the server may initiate any pattern of message exchanges in accordance with the purpose of the communication session. The particular pattern of message exchanges shown in this example is presented to illustrate how the cryptographic keys are rotated, and may be adapted for other message-exchange patterns. FIGS. 9-11 illustrate examples of how to adapt the key-rotation method based on different message-exchange patterns.

At block 614, the server initiates a message-exchange by acquiring an outgoing message from an application on the server, and encrypting the message with the derived symmetric key (S1.1). The server sends 616 the encrypted message and the server-generated key-exchange parameters to the device. At block 618, the device receives the encrypted message and the server-generated key-exchange parameters. The device decrypts the message with the matching derived symmetric key (S1.1) to obtain the plaintext of the message, and passes the plaintext of the message to a consuming application on the device. At block 620, the device generates the new symmetric key (S1.2) from the shared secret (S1). The new symmetric key may be generated using a key derivation function, cryptographic hash, a linear feedback shift register, a pseudorandom number generator, or other function that allows both the server and the device to generate a matching sequence of derived keys from matching seed values. In some implementations, the new symmetric keys are generated using a cryptographic hash of the shared secret and the previously derived symmetric key. In another example, the new symmetric keys are generated using a cryptographic hash of the shared secret and an incrementing index value. At block 622, the server performs a corresponding operation to generate a new symmetric key (S1.2) from the shared secret (S1).

At block 624, the server continues the message-exchange by acquiring another outgoing message from an application on the server, and encrypting the additional message with the new derived symmetric key (S1.2). The server sends 626 the encrypted message 628 to the device. At block 618, the device receives the encrypted message. The device decrypts the message with the matching new derived symmetric key (S1.2) to obtain the plaintext of the additional message, and passes the plaintext of the additional message to the consuming application on the device. At block 630, the device generates another new symmetric key (S1.3) from the shared secret (S1). At block 632, the server generates another new symmetric key (S1.3) that matches another new symmetric key generated by the device.

At block 634, the device begins generating a response to the server. Using the server-generated key-exchange parameters received at block 618, the device generates a random number and a corresponding key-exchange solution. Using the server-generated key-exchange parameters and the random number, the device is able to generate a new shared secret (S2) in accordance with the key-exchange algorithm used by the server. The message-exchange process continues in FIG. 7.

Figure 7:
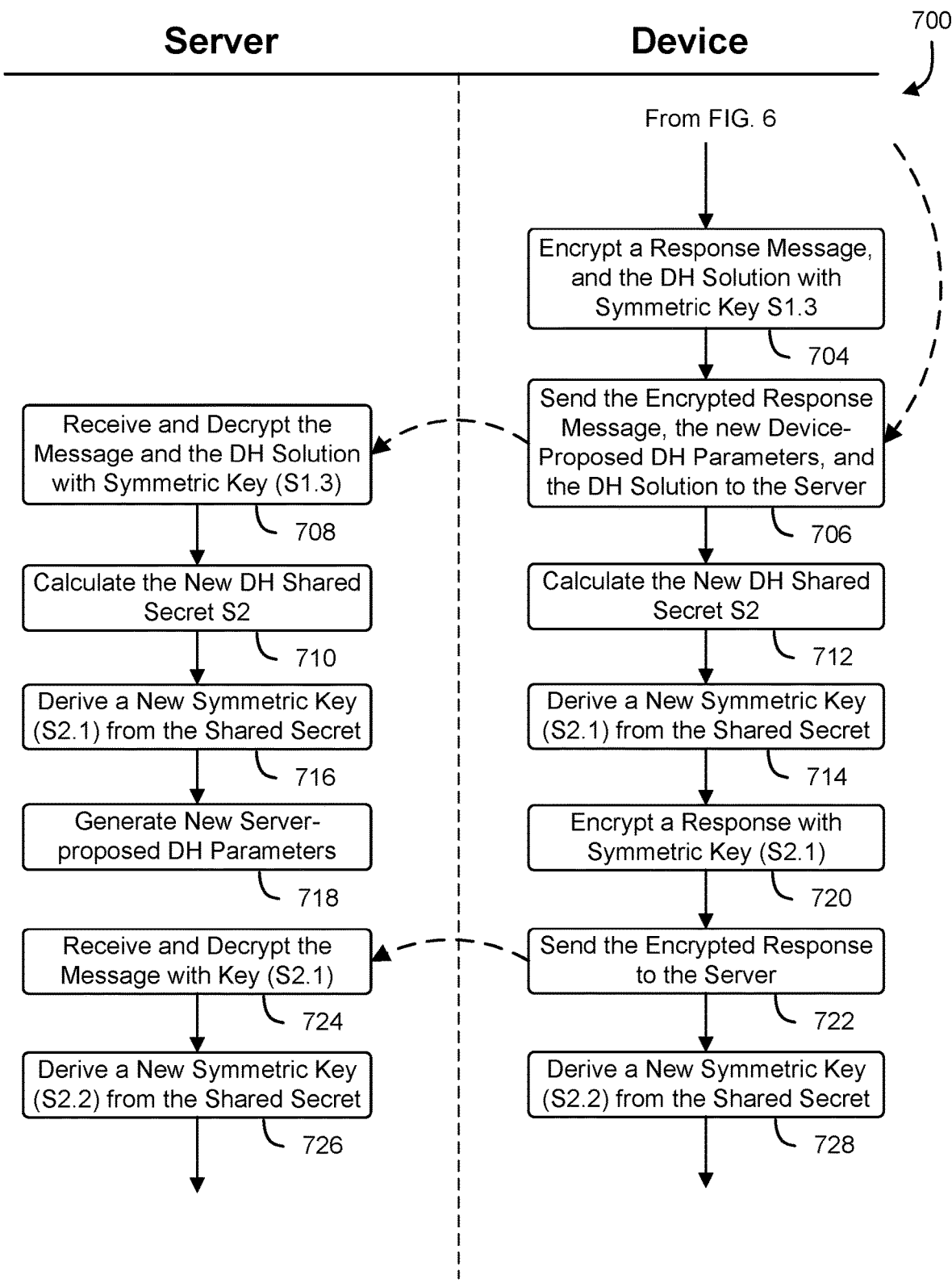
FIG. 7 shows a second part of an illustrative example of a process that, as a result of being performed by a device and a server, performs a message exchange over a protected communication channel using cryptographic keys that are generated with a double-ratchet method.

FIG. 7 shows a second part of an illustrative example of a process that, as a result of being performed by a device and a server, performs a message exchange over a protected communication channel using cryptographic keys that are generated with a double-ratchet method. A swim diagram 700 contains a process from FIG. 6. At block 704, the device acquires a response message from an application on the device, and uses the previously derived symmetric key (S1.3) to encrypt the response, the device-generated key-exchange parameters from block 612, and the key-exchange solution determined at block 634. The encrypted response message, key-exchange solution, and key-exchange parameters are sent 706 to the server. The server receives 708 the encrypted response message, key-exchange solution, and key-exchange parameters, and uses the drive symmetric key (S1.3) to acquire the plaintext of the response message, the key-exchange solution, and the key-exchange parameters.

Using the server-generated key-exchange parameters, and the device-generated key-exchange solution, both the server and the device are able to generate a new shared secret. At block 710, the server uses the server-generated key-exchange parameters and the device-generated key-exchange solution to generate a new shared secret (S2). At block 712, the device uses the server-generated key-exchange parameters and the device-generated key-exchange solution to generate the new shared secret (S2). Both the server and the device derive a new symmetric key from the new shared secret (S2). At block 714, the device derives a new symmetric key (S2.1) from the new shared secret (S2). At block 716, the server derives a matching new symmetric key (S2.1) from the new shared secret (S2). Since the previous server-generated key-exchange parameters have been used, the server generates 718 a new set of server-generated key-exchange parameters that may be sent to the device with a later message.

At block 720, the device acquires a response message from an application running on the device, and encrypts the message with the new symmetric key (S2.1). The encrypted response message is sent 722 to the server. At block 724, the server receives the encrypted response, and decrypts the encrypted response message with the new symmetric key (S2.1). At block 726, the server derives a new symmetric key (S2.2) from the new shared secret (S2). At block 728, the device derives a new symmetric key (S2.2) from the new shared secret (S2).

Variations on the protocol shown in FIG. 7 are possible. In various implementations, the server and the device each provide the other with proposed key-exchange parameters with every message so that each party can respond to a proposed key-exchange with a solution generating a new shared secret each time there is an exchange of messages. Consecutive messages from a single party are protected by driving new symmetric keys for each successive message using a one-way function or cryptographic hash. In some examples, successive symmetric keys are generated for successive messages by driving a new key from the symmetric key used to encode the previous message. In other examples, successive symmetric keys are generated for successive messages by driving a sequence of symmetric keys from a shared secret generated with a key-exchange algorithm. In yet another example, successive symmetric keys are generated using a combination of a shared secret generated with a key-exchange algorithm and symmetric keys used for encoding previous messages.

FIG. 8 shows a first part of an illustrative example of a process that, as a result of being performed by a device and a server, generates a shared secret using a Diffie-Hellman key change process. A swim diagram 800 illustrates a process that begins at block 802 with a server generating a modulus and a generator for a Diffie-Hellman key exchange. At block 804, the server sends the generator and modulus to the device. The device receives 806 the generator and the modulus from the server, and verifies that the generator and modulus are acceptable to the device. If the generator modules are not acceptable, the device may send a rejection to the server or propose a different generator and modulus. In some examples, the server and the device negotiate a generator and modulus to use with the key exchange. At block 808, the server generates a random seed value, and at block 810, the device independently generates a random seed value. The random seed values may be generated with a pseudorandom generation algorithm or a hardware-based random number generator. At block 812, the server uses the generator, the modulus, and the random value generated by the server to generate a solution. In one implementation, the solution is the remainder of the value of the generator, to the power of the random value generated by the server, divided by the modulus. At block 814, the device uses the generator, the modulus, and the random value generated by the device to generate a solution.

At block 816, the server sends the solution generated by the server to the device. At block 818, the device sends the solution generated by the device to the server. At block 820, the server receives the devices solution, and at block 822, the device receives the server solution. At block 824, the server uses the devices solution, the random number generated by the server, the generator, and the modulus, to determine a shared secret. At block 826, the device uses the server solution, the random number generated by the device, the generator, and the modulus to determine a matching shared secret. In some examples, the shared secret is determined by each party taking the solution provided by the other party, raising it to the power of the random number generated by the party, and determining the modulus. The result determined by each party matches, producing a shared secret that can be used to form a cryptographic key.

At blocks 828 and 830, the server and the device establish a secure communication link using the shared secret. In some implementations, the server and the device derive a symmetric cryptographic key from the shared secret, and use the derived symmetric cryptographic key to encrypt and decrypt messages sent between the server and the device.

FIG. 9 shows an illustrative example of a process that, as a result of being performed by a network entity, manages communications with another network entity using a double ratchet protocol. A flowchart 900 shows a process that begins at block 902 with a network entity establishing a network connection with another network entity. The network connection can be established using a TCP/IP connection oriented protocol, an IPX protocol, or other non-encrypted communication protocol. At block 904, the network entity performs a Diffie-Hellman key exchange with the other party to establish a shared secret. In various implementations other key-exchange algorithms may be used, such as ECDH or ECDHE.

At decision block 906, the network entity determines whether an incoming message has been received from the other network entity. If an incoming message has been received from the other network entity, execution advances to block 908 and the network entity derives a new symmetric cryptographic key from the current shared secret key. The new symmetric cryptographic key is derived using an algorithm that matches an algorithm used by the other network entity. The incoming message includes message content, a solution to a pending set of Diffie-Hellman key-exchange parameters, and new Diffie-Hellman key-exchange parameters. In various implementations, the Diffie-Hellman key-exchange parameters include a modulus, a generator, and a solution determined by the other network entity. The new symmetric cryptographic key is used to decrypt 910 the incoming message, and the plaintext of the incoming message is forwarded to an application associated with the network entity. At block 912, the network entity uses the solution to the pending set of Diffie-Hellman key-exchange parameters to generate a new shared secret, and decrypts and stores the new Diffie-Hellman key-exchange parameters with the new symmetric cryptographic key. If, at decision block 906, there is not an incoming message, execution bypasses the above blocks and advances to decision block 914.

At decision block 914, the network entity determines whether there is an outgoing message to be sent to the other network entity. If there is no outgoing message to be sent to the other network entity, execution returns to decision block 906. If there is an outgoing message to be sent to the other network entity, execution advances to block 916. At block 916, the network entity derives a new symmetric cryptographic key from the current shared secret key. The new symmetric cryptographic key is derived using an algorithm that matches an algorithm used by the intended recipient of the message. At block 918, the network entity examines the most recent Diffie-Hellman key-exchange parameters received from the other network entity, generates a corresponding key-exchange solution, and generates a new shared secret. The network entity generates a new set of Diffie-Hellman key-exchange parameters to be provided to the other network entity. At block 920, the key-exchange solution, the new set of Diffie-Hellman key-exchange parameters, and the outgoing message are encrypted using the new derived symmetric cryptographic key, are sent to the other network entity. Using the above method, each successive message sent or received is encrypted using a different derived symmetric cryptographic key, and each message exchange between the parties generates a new shared secret on which to generate derived symmetric cryptographic keys.

FIG. 10 shows a first part of an illustrative example of a process that, as a result of being performed by a network device, provides message acknowledgments in response to incoming messages. A flowchart 1000 shows a process that begins at block 1002 with a network entity establishing a network connection with another network entity. At block 1004, the network entity performs a Diffie-Hellman key exchange with the other party to establish a shared secret. In various implementations other key-exchange algorithms may be used, such as ECDH or ECDHE.

At decision block 1006, the network entity determines whether an incoming message has been received from the other network entity. If an incoming message has been received from the other network entity, execution advances to block 1008 and the network entity derives a new symmetric cryptographic key from the current shared secret key. The new symmetric cryptographic key is derived using an algorithm that matches an algorithm used by the other network entity. The incoming message includes message content, a solution to a pending set of Diffie-Hellman key-exchange parameters, and new Diffie-Hellman key-exchange parameters. In various implementations, the Diffie-Hellman key-exchange parameters include a modulus, a generator, and a solution determined by the other network entity. The new symmetric cryptographic key is used to decrypt 1010 the incoming message, and the plaintext of the incoming message is forwarded to an application associated with the network entity. At block 1012, the network entity uses the solution to the pending set of Diffie-Hellman key-exchange parameters to generate a new shared secret, and decrypts and stores the new Diffie-Hellman key-exchange parameters with the new symmetric cryptographic key. If, at decision block 1006, there is not an incoming message, execution bypasses the above blocks and advances to decision block 1016.

At decision block 1016, the network entity determines whether an incoming message acknowledgment has been received. A message acknowledgment is sent by the other network entity in response to receiving a message from the network entity, and may allow for a more predictable rotation of shared secret keys. If a message acknowledgment has been received, execution advances to block 1018, and the network entity receives a Diffie-Hellman key-exchange solution. The Diffie-Hellman key-exchange solution is used to generate a new shared secret. In some implementations, the message acknowledgment includes new Diffie-Hellman key-exchange parameters which are stored by the network entity. Execution advances to block 1102 on FIG. 11.

FIG. 11 shows a second part of an illustrative example of a process that, as a result of being performed by a network device, provides message acknowledgments in response to incoming messages. A flowchart 1100 shows a continuation of the process shown in FIG. 10. At decision block 1102, the network entity determines whether there is an outgoing message to be sent to the other network entity. If there is no outgoing message to be sent to the other network entity, execution returns to decision block 1006 of FIG. 10. If there is an outgoing message to be sent to the other network entity, execution advances to block 1104. At block 1104, the network entity derives a new symmetric cryptographic key from the current shared secret key. The new symmetric cryptographic key is derived using an algorithm that matches an algorithm used by the intended recipient of the message. At block 1106, the network entity examines the most recent Diffie-Hellman key-exchange parameters received from the other network entity, generates a corresponding key-exchange solution, and generates a new shared secret. The network entity generates a new set of Diffie-Hellman key-exchange parameters to be provided to the other network entity. At block 1108, the key-exchange solution, the new set of Diffie-Hellman key-exchange parameters, and the outgoing message are encrypted using the new derived symmetric cryptographic key and sent to the other network entity.

Figure 12:
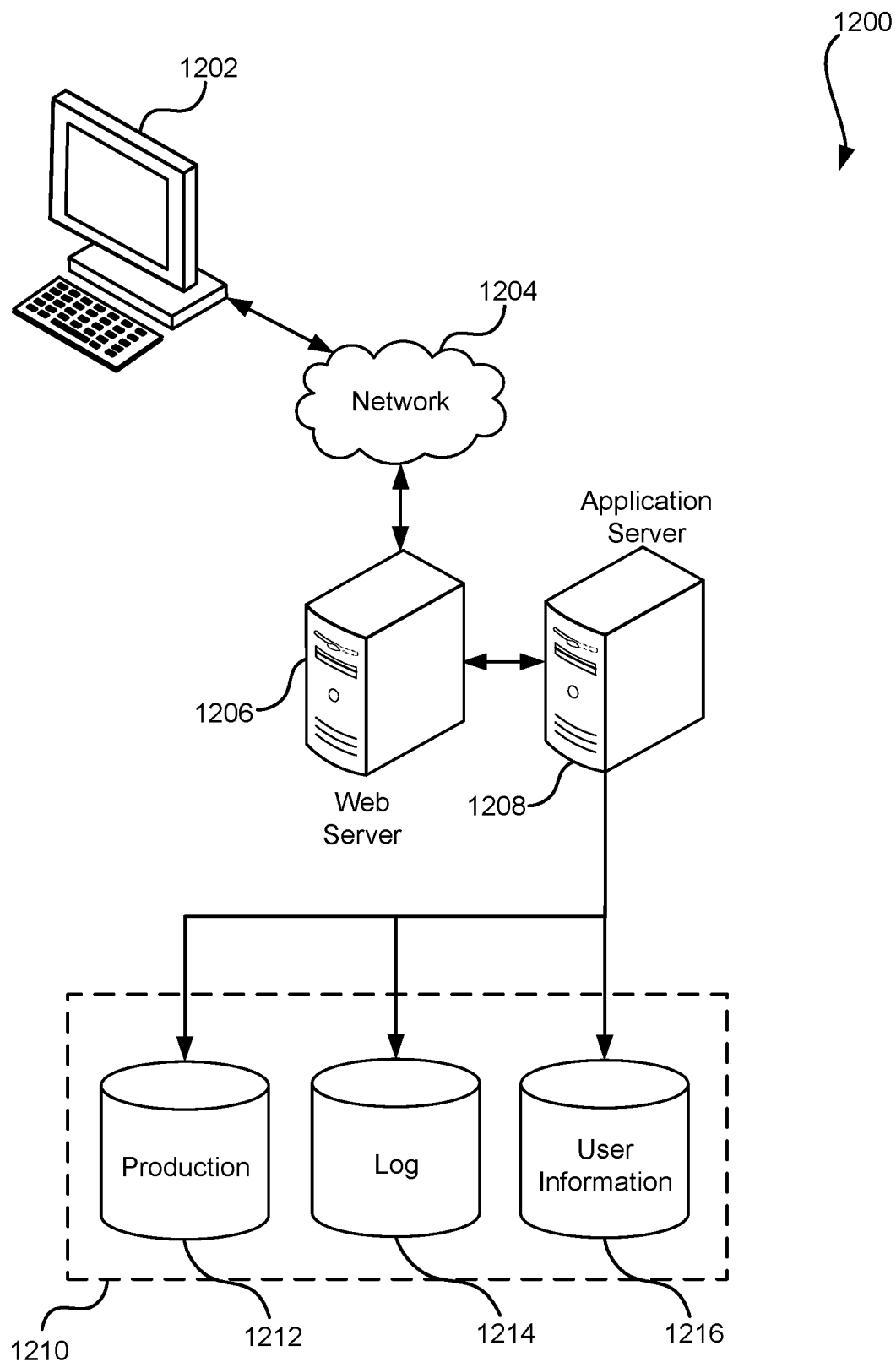
FIG. 12 illustrates an environment in which various embodiments can be implemented.

FIG. 12 illustrates aspects of an example environment 1200 for implementing aspects in accordance with various embodiments. As will be appreciated, although a web-based environment is used for purposes of explanation, different environments may be used, as appropriate, to implement various embodiments. The environment includes an electronic client device 1202, which can include any appropriate device operable to send and/or receive requests, messages, or information over an appropriate network 1204 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 1206 for receiving requests and serving content in response thereto, although for other networks an alternative device serving a similar purpose could be used as would be apparent to one of ordinary skill in the art.

The illustrative environment includes at least one application server 1208 and a data store 1210. It should be understood that there can be several application servers, layers, or other elements, processes, or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 1202 and the application server 1208, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1210 can include several separate data tables, databases, data documents, dynamic data storage schemes, and/or other data storage mechanisms and media for storing data relating to a particular aspect of the present disclosure. For example, the data store illustrated may include mechanisms for storing production data 1212 and user information 1216, which can be used to serve content for the production side. The data store also is shown to include a mechanism for storing log data 1214, which can be used for reporting, analysis or other such purposes. There can be many other aspects that may need to be stored in the data store, such as page image information and access rights information, which can be stored in any of the above listed mechanisms as appropriate or in additional mechanisms in the data store 1210. The data store 1210 is operable, through logic associated therewith, to receive instructions from the application server 1208 and obtain, update, or otherwise process data in response thereto. The application server 1208 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the client device 1202. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM®, as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

As discussed, numerous variations utilize symmetric and/or asymmetric cryptographic primitives. Symmetric key algorithms may include various schemes for performing cryptographic operations on data including block ciphers, stream ciphers, and digital signature schemes. Example symmetric key algorithms include the advanced encryption standard (AES), the data encryption standard (DES), triple DES (3DES), Serpent, Twofish, blowfish, CAST5, RC4, and the international data encryption algorithm (IDEA). Symmetric key algorithms may also include those used to generate output of one way functions and include algorithms that utilize hash-based message authentication codes (HMACs), message authentication codes (MACs) in general, PBKDF2, and Bcrypt. Asymmetric key algorithms may also include various schemes for performing cryptographic operations on data. Example algorithms include those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS #1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme and the ECQV implicit certificate scheme. Other algorithms and combinations of algorithms are also considered as being within the scope of the present disclosure and the above is not intended to be an exhaustive list.

Note that the term "digital signature" includes any information usable to cryptographically verify authenticity of a message including information generated using an RSA-based digital scheme (such as RSA-PSS), the digital signature algorithm (DSA) and the elliptic curve digital signature algorithm, the ElGamal signature scheme, the Schnorr signature scheme, the Pointcheval-Stern signature algorithm, the Rabin signature algorithm, pairing-based digital signature schemes (such as the Boneh-Lynn-Schacham signature scheme), undeniable digital signature schemes, and others. Further, message authentication codes (such as hash-based message authentication codes (HMACs), keyed cryptographic hash functions, and other types of information may also be used as digital signatures.

The phrase "one-way function" includes functions that are not necessarily one-way in the strict mathematical sense, but that exhibit properties (such as collision resistance, preimage resistance and second preimage resistance) that render the function useful in contexts in which the various techniques of the present disclosure are applied. In this manner, an entity with output of the function but without access to the corresponding input, is unable to determine the input without, for instance, extraordinary expenditure of computational resources necessary for a cryptographic (e.g., brute force) attack. One-way functions (also referred to as "effectively one-way functions") include, but are not limited to, cryptographic hash functions such as message authentication codes, (e.g., hash based message authentication code (HMAC)), key derivation functions, such as PBKDF2 and bcrypt (with the password being based at least in part on the plaintext and the cryptographic key, e.g.) and other secure randomization functions which may, but do not necessarily, have a domain (set of possible inputs) that is larger than their range (possible outputs). Other suitable functions (referred to as "f") for various embodiments include, but are not limited to, functions that take at least a plaintext and cryptographic key as input and that have a property of preimage resistance (given a value y, the probability of randomly generating an input x such that $f(x)=y$ is below a specified threshold), second preimage resistance (given an input x1, the probably of randomly generating another input x2, different from x1, such that $f(x1)=f(x2)$ is below a specified threshold) and/or collision resistance (the probability of two different inputs resulting in the same output is less than a specified threshold). The exact threshold for each probability may be context-dependent, with lower probabilities corresponding to higher security contexts. Hash functions usable as one-way functions in accordance with the techniques of the present disclosure include, but are not limited to, functions described in the National Institute of Standards and Technology (NIST) Special Publication 800-107, Revision 1 "Recommendation for Applications Using Approved Hash Algorithms," which is incorporated herein by reference.

A system is said to be configured to trust a public cryptographic key if logic with which the system is configured to operate is dependent on whether an attempt to verify a digital signature with the public cryptographic key is successful. Similarly, a system is said to be configured to trust a symmetric cryptographic key if logic with which the system is configured to operate is dependent on whether an attempt to verify a digital signature with the symmetric cryptographic key is successful.

In various embodiments, data objects such as digital signatures may be cryptographically verifiable. In one example, cryptographically verifiable data objects are created to be cryptographically verifiable by the system to which the data object is to be provided or another system that operates in conjunction with the system to which the data object is to be provided. For example, the data object may be encrypted so as to be decryptable by the system that will cryptographically verify the data object, where the ability to decrypt the data object serves as cryptographic verification of the data object. As another example, the data object may be digitally signed (thereby producing a digital signature of the data object) such that the digital signature is verifiable by the system that will cryptographically verify the data object. In other examples, both encryption and digital signatures are used for cryptographic verifiability and/or security. The key used to encrypt and/or digitally sign the data object may vary in accordance with various embodiments and the same key is not necessarily used for both encryption and digital signing, where applicable. In some embodiments, a key used to encrypt the data object is a public key of a public/private key pair where the private key of the key pair is maintained securely by the system to which the data object is to be provided, thereby enabling the system to decrypt the data object using the private key of the key pair. Using the public key to encrypt the data object may include generating a symmetric key, using the symmetric key to encrypt the data object, and encrypting the symmetric key using the public key, where the encrypted symmetric key is provided to a system with the encrypted data object to enable the system to use the corresponding private key to decrypt the symmetric key and use the decrypted symmetric key to decrypt the data object. Further, in some embodiments, the data object is digitally signed using a private key of a public/private key pair corresponding to the computer system that encrypts and/or digitally signs the data object (e.g., a user device). For example, an application may be provisioned with the private key and the data object may include a certificate for the private key for use by a system for verification of the digital signature of the data object. Other variations, including variations where a symmetric key shared between the user computer and the system that cryptographically verifies the data object can be used to encrypt and/or digitally sign the data object.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A non-transitory computer-readable storage medium having stored thereon executable instructions that, as a result of being executed by one or more processors of a computer system, cause the computer system to at least:
   generate a first cryptographic key from a first shared secret acquired by performing a key-exchange process over a network with a network entity;
   generate a first key-exchange solution from a first set of key-exchange parameters received from the network entity;
   generate a second set of key-exchange parameters;
   send a first message to the network entity, the first message encrypted with the first cryptographic key, the first message including a first message payload, the first key-exchange solution, and the second set of key-exchange parameters; and
   generate a second cryptographic key from a second shared secret derived from the first set of key-exchange parameters and the first key-exchange solution.

2. The non-transitory computer-readable storage medium of claim 1, wherein the executable instructions further cause the computer system to:
   send a second message to the network entity, the second message encrypted with the second cryptographic key, the second message including a second message payload; and
   generate a third cryptographic key from the second shared secret.

3. The non-transitory computer-readable storage medium of claim 1, wherein the executable instructions further cause the computer system to:
   receive a second message from the network entity, the second message encrypted with the second cryptographic key, the second message including a second message payload, and a second key-exchange solution for the second set of key-exchange parameters;
   generate a third shared secret from the second set of key-exchange parameters and the second key-exchange solution; and
   generate a third cryptographic key from the third shared secret.

4. The non-transitory computer-readable storage medium of claim 3, wherein the executable instructions further cause the computer system to:
   receive an acknowledgment message from the network entity, the acknowledgment message encrypted with the second cryptographic key, the acknowledgment message including a second key-exchange solution for the second set of key-exchange parameters;
   generate a third shared secret from the second set of key-exchange parameters and the second key-exchange solution; and
   generate a third cryptographic key from the third shared secret.

5. The non-transitory computer-readable storage medium of claim 1, wherein:
   the computer system receives a threshold number of messages from the network entity without sending an intervening response; and
   as a result of having not sent an intervening response, the computer system:
      sends an acknowledgment message to the network entity, the acknowledgment message including a key-exchange solution; and
      generates a new shared secret based at least in part on the key-exchange solution.

6. The non-transitory computer-readable storage medium of claim 1, wherein the key-exchange process is a Diffie-Hellman, Elliptic Curve Diffie-Hellman, or Ephemeral Elliptic Curve Diffie-Hellman process.

7. A computer-implemented method performed by a networked device, comprising:
   generating a first cryptographic key from a first shared secret obtained by performing a key-exchange process over a network with a network entity;
   generating a first key-exchange solution from a first set of key-exchange parameters received from the network entity;
   generating a second set of key-exchange parameters;
   sending a first message to the network entity, the first message encrypted with the first cryptographic key, the first message including a first message payload, the first key-exchange solution, and the second set of key-exchange parameters; and
   generating a second cryptographic key from a second shared secret derived from the first set of key-exchange parameters and the first key-exchange solution.

8. The computer-implemented method of claim 7, wherein:
   the first set of key exchange parameters includes a first prime number, a first generator, a first elliptic curve, and a first challenge;
   the second set of key-exchange parameters includes a second prime number, a second generator, a second elliptic curve, and a second challenge; and
   the first set of key-exchange parameters is different than the second set of key-exchange parameters.

9. The computer-implemented method of claim 7, wherein:
   the first cryptographic key is generated from the first shared secret using a key derivation function; and
   the second cryptographic key is generated from the second shared secret using the key derivation function.

10. The computer-implemented method of claim 7, wherein the second cryptographic key is based at least in part on a cryptographic hash of the first cryptographic key and a cryptographic hash of the second shared secret.

11. The computer-implemented method of claim 7, wherein:

the first cryptographic key is generated from a cryptographic hash of a combination of the first shared secret and a first number of a number sequence;
the second cryptographic key is generated from a cryptographic hash of a combination of the second shared secret and a second number of the number sequence; and
the first number of the number sequence and the second number of the number sequence are consecutive numbers in the number sequence.

12. The computer-implemented method of claim 7, wherein:
the networked device and the network entity establish a TCP connection over the network;
the first set of key-exchange parameters and the second set of key-exchange parameters are exchanged over the TCP connection; and
the networked device and the network entity exchange authentication information that allows the networked device and the network entity to be mutually authenticated.

13. A system, comprising at least one computing device that includes one or more processors and a physical memory containing instructions that, when executed by the one or more processors causes the system to:
generate a first cryptographic key from a first shared secret acquired by performing a key-exchange process over a network with a network entity;
generate a first key-exchange solution from a first set of key-exchange parameters received from the network entity;
generate a second set of key-exchange parameters;
send a first message to the network entity, the first message encrypted with the first cryptographic key, the first message including a first message payload, the first key-exchange solution, and the second set of key-exchange parameters; and
generate a second cryptographic key from a second shared secret derived from the first set of key-exchange parameters and the first key-exchange solution.

14. The system of claim 13, wherein the instructions further cause the system to:
acquire information from a directory service that enables the system to locate the network entity on a computer network; and
authenticate the network entity using authentication information acquired from the directory service.

15. The system of claim 13, wherein the instructions further cause the system to:
determine that at least a threshold number of consecutive incoming messages have been received; and
as a result of receiving at least a threshold number of consecutive incoming messages, send an acknowledgment message to the device, the acknowledgment message including a key-exchange parameter that causes the system and the network entity to generate a new shared secret.

16. The system of claim 13, wherein the system:
obtain a threshold number of consecutive incoming messages; and
as a result of obtaining the threshold number of consecutive incoming messages, provide the first message to the network entity where the first message payload is empty.

17. The system of claim 13, wherein:
the instructions further cause the system to send a sequence of message payloads to the network entity, the sequence of message payloads encrypted with a sequence of symmetric cryptographic keys;
the sequence of symmetric cryptographic keys are generated using a key derivation function applied to a sequence of seed values;
the seed values are cryptographic hashes of a combination of the first shared secret and individual elements of a numerical sequence; and
the numerical sequence is known to the network entity.

18. The system of claim 13, wherein the instructions further cause the system to:
send a threshold number of messages to the network entity, the threshold number of messages encrypted with the first cryptographic key; and
generate the second cryptographic key as a result of sending the threshold number of messages encrypted with the first cryptographic key.

19. The system of claim 13, wherein the key-exchange process is an Elliptic Curve Diffie-Hellman process using an X25519 curve or an X448 curve.

20. The system of claim 13, wherein:
the key-exchange process is an Elliptic Curve Diffie-Hellman process; and
the first set of key-exchange parameters includes a named elliptic curve or a set of elements defining an elliptic curve.

* * * * *